(12) United States Patent
Tomisato et al.

(10) Patent No.: US 7,652,981 B2
(45) Date of Patent: Jan. 26, 2010

(54) ORTHOGONAL FREQUENCY MULTI-CARRIER TRANSMISSION DEVICE AND TRANSMISSION METHOD

(75) Inventors: Shigeru Tomisato, Okayama (JP); Hirohito Suda, Kanagawa (JP); Takefumi Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 568 days.

(21) Appl. No.: 10/537,287

(22) PCT Filed: Dec. 2, 2003

(86) PCT No.: PCT/JP03/15399

§ 371 (c)(1),
(2), (4) Date: Nov. 10, 2006

(87) PCT Pub. No.: WO2004/051900

PCT Pub. Date: Jun. 17, 2004

(65) Prior Publication Data

US 2007/0153673 A1    Jul. 5, 2007

(30) Foreign Application Priority Data

Dec. 2, 2002  (JP) ............................ 2002-349917

(51) Int. Cl.
    *H04L 11/00* (2006.01)
(52) U.S. Cl. .................................................... 370/210
(58) Field of Classification Search ........................ None
    See application file for complete search history.

(56) References Cited

U.S. PATENT DOCUMENTS 6,175,551 B1 * 1/2001 Awater et al. ............... 370/210
6,266,633 B1 * 7/2001 Higgins et al. .............. 704/224
6,535,066 B1 * 3/2003 Petsko ........................ 330/285
2001/0022777 A1   9/2001 Bourget et al.
2002/0136278 A1 * 9/2002 Nakamura et al. ......... 375/148
2002/0159550 A1  10/2002 Jin
2003/0210647 A1 * 11/2003 Yang et al. ................. 370/208
2007/0053458 A1 * 3/2007 Taunton ..................... 375/260

FOREIGN PATENT DOCUMENTS

| DE | 198 38 295 A 1 | 6/1999 |
|---|---|---|
| EP | 0 725 510 A1 | 8/1996 |
| EP | 1 195 962 | 4/2002 |
| EP | 1 213 864 A1 | 6/2002 |
| JP | 09-107345 | 4/1997 |
| JP | 09-149090 | 6/1997 |
| JP | 2000-049745 | 2/2000 |
| JP | 2001-251274 | 9/2001 |
| JP | 2001-339361 | 12/2001 |
| JP | 2002-314503 | 10/2002 |
| WO | WO 00/62452 | 10/2000 |

* cited by examiner

*Primary Examiner*—Kwang B Yao
*Assistant Examiner*—Jutai Kao
(74) *Attorney, Agent, or Firm*—Oblon, Spivak, McClelland, Maier & Neustadt, L.L.P.

(57) ABSTRACT

Symbols converted by a serial-to-parallel converting part (12) from serial to parallel form are subjected to inverse Fourier transform processing in an inverse Fourier transform part (13) as sub-carrier signal components of a frequency interval equal to the symbol rate, then the levels of the resulting time domain signal components are compared with a permissible peak level $C_{th}$ in a peak component detecting part (22) to detect peak components, and the peak components are transformed by a Fourier transform part (23) to frequency domain components, which are subtracted by subtractors ($24_0$ to $24_{N-1}$) from the corresponding sub-carrier signal components to thereby reduce the peak power.

19 Claims, 18 Drawing Sheets

ORTHOGONAL FREQUENCY MULTI-CARRIER TRANSMISSION DEVICE AND TRANSMISSION METHOD

TECHNICAL FIELD

The present invention relates to a transmitting apparatus and method using an orthogonal frequency multi-carrier as in the case of, for example, OFDM (Orthogonal Frequency Division Multiplexing) or OFCDM (Orthogonal Frequency Code Division Multiplexing) in a mobile communication system.

PRIOR ART

In communications via ground wave propagation paths it is to be hoped to enhance the frequency-band utilization efficiency and to lessen the influence of multi-path. As one method that meets the requirements, there is utilized an OFDM modulation system using a multi-carrier. FIG. 18 shows an example of a conventional transmitting apparatus using the OFDM scheme. The OFDM signal transmitting apparatus are generally composed of a serial-to-parallel converting part 12, an inverse Fourier transform part (which is shown as IFFT in FIG. 18) 13, a parallel-to-serial converting part 14, a guard interval inserting circuit 15, a main carrier generator 16, an up-converter 17, and a high-frequency power amplifier 18.

A symbol sequence $x_0, x_1, \ldots$, of a symbol rate $1/T$ (T being a symbol period), which is input to an input terminal 6, is converted from serial to parallel form every N symbols in the serial-to-parallel converting part 12 to obtain a set of N parallel symbols $x_0(i), x_1(i), \ldots, x_{N-1}(i)$. The integer i is a parameter indicating an i-th serial-to-parallel conversion. These parallel symbols are handled as N sub-carriers of a frequency interval $1/T$ as shown in spectral form in FIG. 19, and they are subjected to inverse Fourier transform (for instance, IFFT) processing in the inverse Fourier transform part 13 to obtain N time domain signals, thereby providing base band signals $s_{t0}(i), s_{t1}(i), \ldots, s_{tN-1}(i)$ each using one of the N modulated sub-carrier as its frequency component.

The parallel signals are converted by the parallel-to-serial converting part 14 to a serial signal sequence (a time-series signal), in which a guard interval GI is inserted, for example, every packet, in the guard interval inserting part 15, then its output is applied to the up converter 17, wherein it is mixed with a main carrier signal of a frequency $f_c$ from the carrier generator 16 and up-converted, and the up-converted output is amplified by the high-frequency power amplifier 18, thereafter being fed to an output terminal 19.

In the OFDM signal, by setting the frequency interval of the sub-carrier signals at $1/T$ (T being the symbol period) as mentioned above, the sub-carrier signals are orthogonal to each other, and hence they can easily be separated by FFT at the receiving side.

Since the OFDM signal is basically a multi-carrier signal, there is the possibility of occurrence of large peak power according to the phase of each sub-carrier signal. For example, when N sub-carrier signals are all added in the same phase, a peak power N times larger than the average power is generated. Since distortion occurs with the peak power beyond a linear operation input range of the high-frequency power amplifier 18, if the average operating power of the amplifier is set low (i.e., the backoff is increased) relative to its maximum power so that an expected peak power becomes equal to or lower than the maximum power of the amplifier, there arises a problem that the power amplification efficiency is impaired. To avoid the, it is to be wished to reduce the peak power of the multi-carrier signal.

For example, in Japanese Patent Gazette No.3235769 there is set forth a technique for reducing the peak power of such a multi-carrier signal, though not the OFDM signal. In this Japanese patent, peak reduction is implemented by: detecting peak components exceeding a permissible peak level, which is a transmission peak level permissible in the system, from multi-carrier signal outputs; converting the detected peak components to respective transmitting sub-carrier frequency components; and subtracting the converted signals from respective sub-carrier modulated signals.

In the technique described in this Japanese patent, however, since the OFDM signal or OFCDM signal is not assumed in the form of the transmitting multi-carrier signal, no account is taken of the case where the frequency interval of the sub-carries is $1/T$, and there is not shown a configuration using IFFT or FFT. Furthermore, when there is in the band of the OFDM signal a sub-carrier that cannot be used for the reason that it is used by a different user, it cannot be expected to produce a sufficient peak power reduction effect by the technique of the above-mentioned Japanese patent.

Accordingly, an object of the present invention is to provide an orthogonal frequency multi-carrier transmitting apparatus capable of reducing the peak power of a multi-carrier transmitting signal such as the OFDM signal or OFCDM signal, and a transmitting method using the transmitting apparatus.

SUMMARY OF THE INVENTION

According to the present invention, an orthogonal frequency multi-carrier transmitting apparatus and method, in which plural symbols to be transmitted are arranged on the frequency axis as plural sub-carrier signal components having a frequency interval equal to the symbol rate, then converted to time domain signals, then up-converted, and transmitted after power amplification, are characterized in that the peak component of the transmitting power is suppressed by: performing inverse Fourier transform processing of said plural sub-carrier signal components to transform them to plural time domain signal components; comparing each of said plural time domain signal components with a predetermined permissible peak level to detect peak components exceeding said permissible peak level; Fourier-transforming said peak components to frequency domain components corresponding to said sub-carrier signal components; and subtracting said frequency domain components from said plural sub-carrier signal components. By this, it is possible to achieve high frequency utilization efficiencies by the orthogonal frequency multi-carrier transmission and reduce the peak power and hence increase the power efficiency of the high-frequency power amplifier.

According to the present invention, further, the peak components of the time domain are detected by: setting said peak components are set at zero when the levels of said time domain signal components are equal to or lower than said permissible peak level; using the differences between said time domain signal components and said permissible peak level as said peak components when the levels of said time domain signal components exceeds said permissible peak level.

According to the present invention, further, deterioration of the received characteristics can be suppressed by the providing a Fourier-transformed output signal control part which compares the level of each of said frequency domain components from said Fourier transform part with a predetermined peak-reduced signal permissible level, and controls the level of said each frequency domain component to become equal to or lower than said peak-reduced signal permissible level.

According to the present invention, further, the power efficiency can be increased by determining said permissible peak level in accordance with the level of the power-amplified transmitting signal.

According to the present invention, further, other transmitting apparatuses are enabled to use the same sub-carrier sets by: copying each of said plural symbols to a number SF equal to the value of a spreading factor SF; spreading said copied outputs by spreading codes; and outputting the spread outputs as said plural sub-carrier signal components.

According to the present invention, further, plural symbols are each copied to a number SF equal to the value of a spreading factor in each of plural routes to which plural symbols are input, then said plural copied outputs of each route are spread by a different spreading code, and the corresponding components of the respective spread outputs of said plural routes are combined and output as said plural sub-carrier signal components, whereby plural users are enabled to use the same sub-carrier sets on the same transmitting apparatus and the frequency utilization efficiency can be increased.

According to the present invention, further, by spreading said combined outputs by a long code and outputting the spread outputs as said plural sub-carrier signal components, transmitting apparatuses in plural base stations are enabled to use the same sub-carrier sets, and hence the frequency utilization efficiency can be increased.

According to the present invention, by repeatedly performing peak reduction processing until the levels of all of said plural time domain signal components become equal to or lower than said permissible peak level, it is possible to hold deterioration of the received characteristics within a permissible range to maintain the peak power at a value equal to or smaller than a prescribed value.

According to the present invention, it is possible to simplify the configuration of the transmitting apparatus and increase its processing speed by reading out the time domain signal components corresponding to said sub-carrier signal component from a memory in which there are stored time domain signal components that are obtained when peak reduction processing by said inverse Fourier transform, said peak component detection, said Fourier transform and said subtraction is performed in advance for each possible combination of the respective sub-carrier components until peak components become equal to or lower than said permissible peak level.

BEST MODE FOR CARRYING OUT THE INVENTION

FIRST EMBODIMENT

Figure 1:
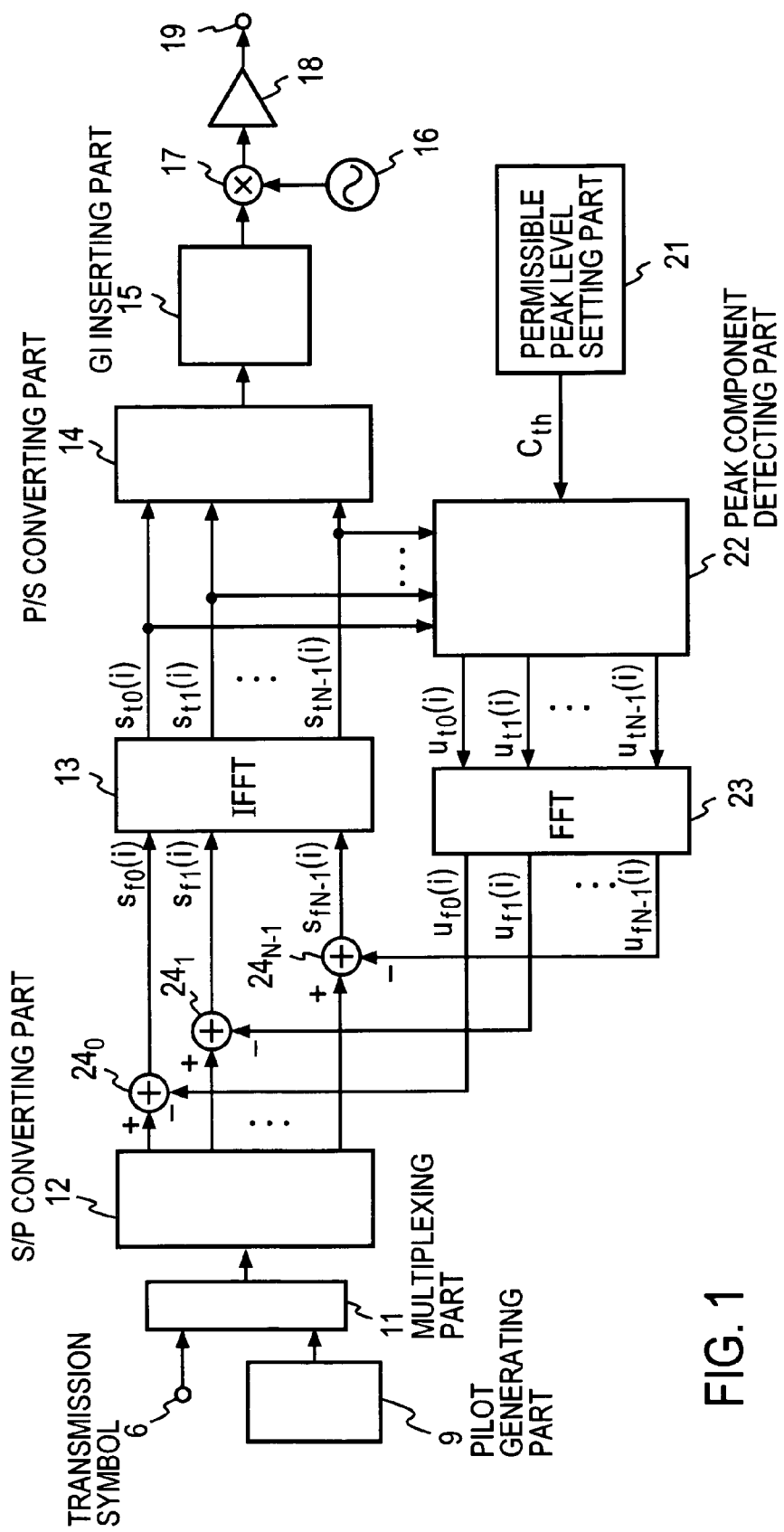
FIG. 1 is a block diagram illustrating a first embodiment of the transmitting apparatus according to the present invention which uses OFDM.
Figure 18:
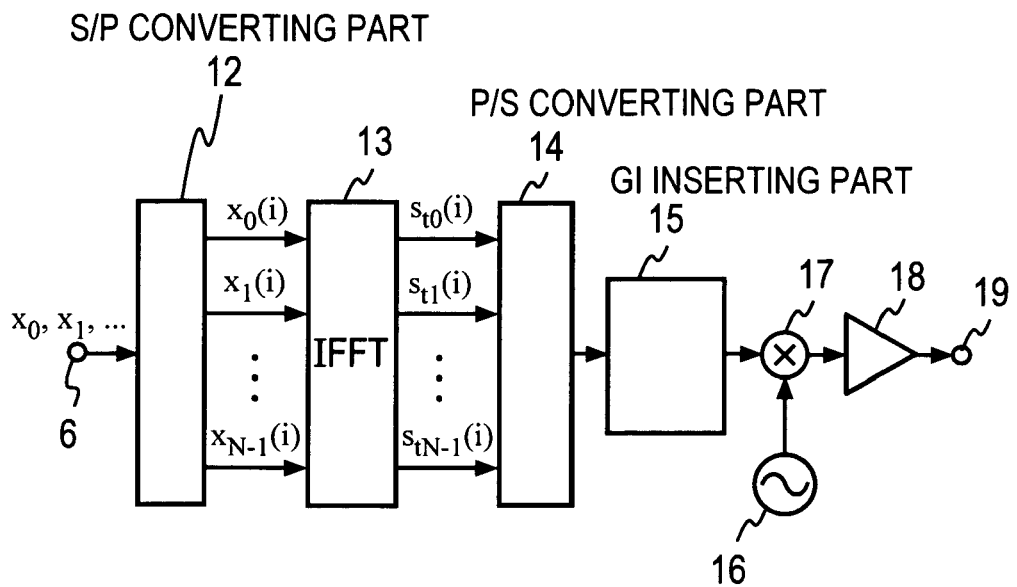
FIG. 18 is a block diagram for explaining a conventional transmitting apparatus using OFDM.
Figure 19:
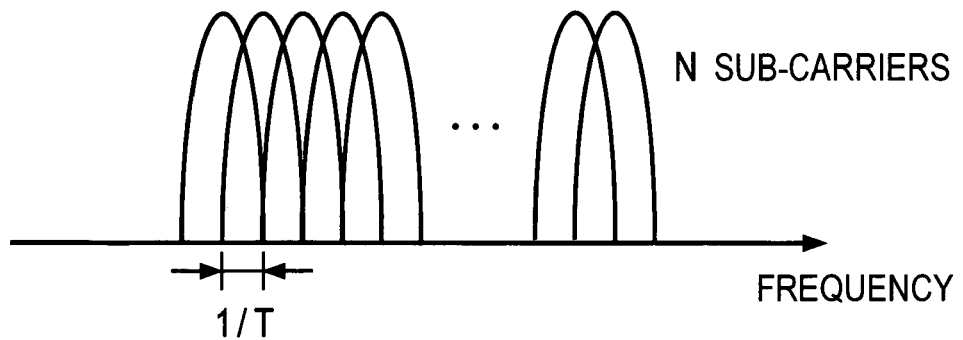
FIG. 19 is a diagram for explaining the band of a sub-carrier in OFDM.

FIG. 1 illustrates a first embodiment of the transmitting apparatus according to the present invention for use in a mobile communication system. This embodiment differs from the conventional configuration of FIG. 18 in the addition thereto of: a pilot generating part 9 for generating a pilot; a multiplexing part 11 that multiplexes the pilot and transmission symbols provided to the terminal 6 and provides the multiplexed output to the serial-to-parallel converting part 12; a permissible peak level setting part 21 for setting a permissible peak level $C_{th}$; a peak component detecting part 22 for detecting peak components exceeding the permissible peak level $C_{th}$ from the outputs of the inverse Fourier transform part 13; a Fourier transform part 23 that performs Fourier-transform processing (FFT in this case) of the peak components; subtractors $24_0$ to $24_{N-1}$ for subtracting the outputs from the Fourier transform part 23 from the input signals to the inverse Fourier transform part 13. The pilot is multiplexed with the transmitting signal so that it is disposed at the beginning of each frame, and on the receiving side it is used to estimate transmission line characteristics.

The peak component detecting part 22 is supplied with the permissible peak level $C_{th}$ from the permissible peak level setting part 21, and subtracts the permissible peak level value $C_{th}$ from the levels of respective time domain signal components $s_{t0}(i)$ to $s_{tN-1}(i)$ output from the inverse Fourier transform part 13 to thereby generate peak components $u_{t0}(i)$ to $u_{tN-1}(i)$. In the case where the level of the time domain signal component $s_{tk}(i)$ is equal to or lower than th permissible level $C_{th}$, however, the corresponding peak component $u_{tk}(k)$ is set at zero. These peak components $u_{t0}(i)$ to $u_{tN-1}(i)$ are transformed in the Fourier transform part 23 to frequency domain components $u_{f0}(i)$ to $u_{fN-1}(i)$, and the thus obtained frequency domain components are subtracted by the subtractors $24_0$ to $24_{N-1}$ from input signals $s_{f0}(i)$ to $s_{fN-1}(i)$ to the inverse Fourier transform part 13. The subtracted output signals are subjected again to inverse Fourier transform (IFFT in this case) processing in the inverse Fourier transform part 13, and peak components of the output therefrom are detected again in the peak component detecting part 22.

The above-mentioned peak component detection and the processing for subtracting the detected peak components from the inputs to the inverse Fourier transform part 13 are repeated until every inverse Fourier transform output level (time domain signal component level) becomes equal to or lower than the permissible peak level $C_{th}$. At the time when the levels of all the peak components becomes equal to or lower than the permissible peak level $C_{th}$, the peak reduction processing is stopped, and the outputs from the inverse Fourier transform part 13 at this time are converted by the parallel-to-serial converting part 14 to one time series and output as an OFDM signal as in the case of FIG. 18. Normally, the OFDM signal is generated by inserting the guard interval GI into the converted output in the guard interval inserting part 15 as described previously with respect to FIG. 18. The OFDM signal is converted by the up converter 17 to a radio-frequency signal, which is amplified by the high-frequency amplifier 18 and output therefrom.

Figure 2:
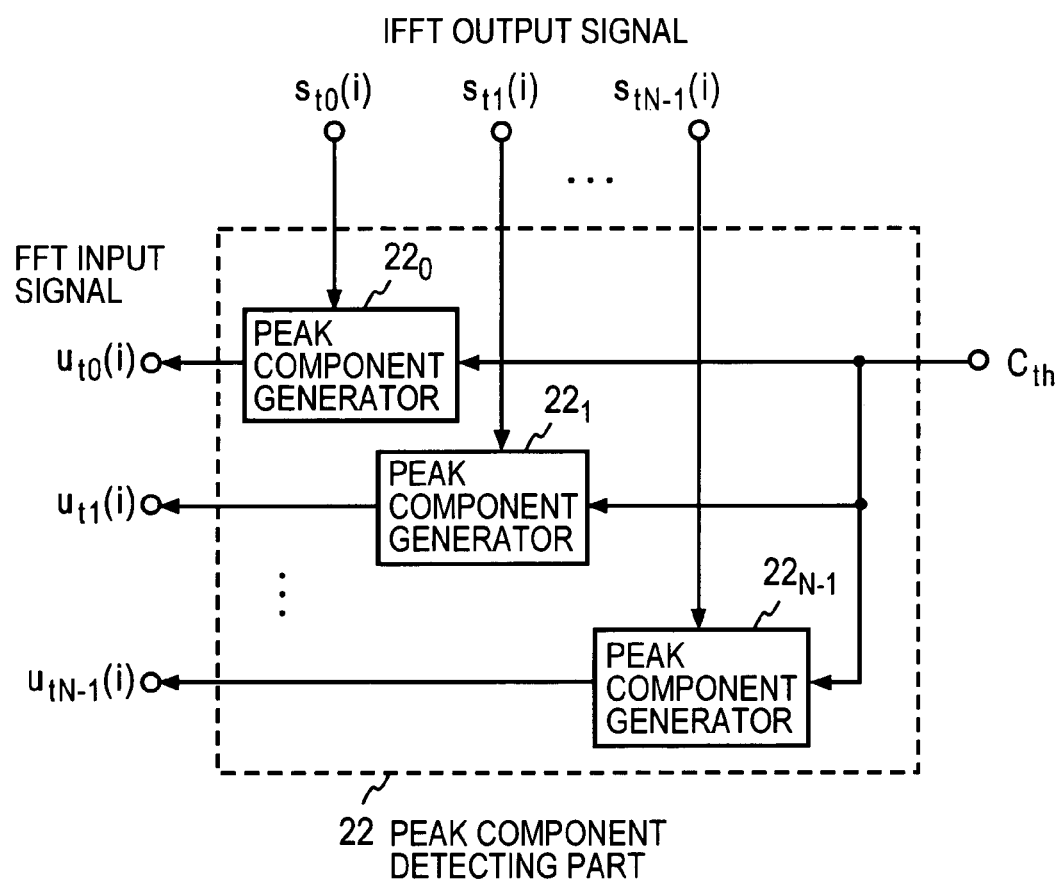
FIG. 2 is a block diagram showing an example of the configuration of a peak component detecting part 22 in the FIG. 1 embodiment.

FIG. 2 shows an example of the configuration of the peak component detecting part 22. The peak component detecting part 22 is made up of N peak component generators $22_0$ to $22_{N-1}$. Letting an input signal $S_f(i)$ to and an output signal $S_t(i)$ from the inverse Fourier transform part 13 for an i-th converted output from the serial-to-parallel converting part 12 in FIG. 1 be expressed by $$S_f(i) = (s_{f0}(i), \ldots, s_{f1}(i), \ldots, s_{fN-1}(i)) \quad (1)$$

$$S_t(i) = (s_{t0}(i), \ldots, s_{t1}(i), \ldots, s_{tN-1}(i)) \quad (2)$$

Each element $s_{tk}(i)$ of the output signal from the inverse Fourier transform part 13 can be expressed by the following equation by use of each element $s_{fn}(i)$ of the input signal $S_f(i)$.

$$s_{tk}(i) = \frac{1}{N} \sum_{n=0}^{N-1} s_{fn}(i) e^{j2\pi kn/N} \quad (3)$$

where k=0, 1, ..., N-1.

Letting the peak component $U_t(i)$ to be generated in the peak component detecting rt 22 be expressed by $$U_t(i) = (u_{t0}(i), u_{t1}(i), \ldots, u_{tN-1}(i)) \quad (4)$$

Each peak component generator $22_k$ generates the peak component $u_{tk}(i)$ that is defined by the following equation using the permissible peak level $C_{th}$ set in the permissible peak level setting part 21.

$$u_{tk}(i) = \begin{cases} 0, & \text{for } |s_{tk}(i)| \leq C_{th}| \\ s_{tk}(i) - s_{tk}(i)\frac{C_{th}}{|s_{tk}(i)|}, & \text{for } |s_{tk}(i)| > C_{th} \end{cases} \quad (5)$$

Each component $u_{fn}(i)$ of the frequency domain signal $U_f(i) = (u_{f0}(i), u_{f1}(i), \ldots, u_{fN-1}(i))$ obtained by the Fourier transform processing of the peak component $U_t(i)$ in the Fourier transform part 23 is expressed by the following equation.

$$u_{fn}(i) = \sum_{k=0}^{N-1} u_{tk}(i) e^{-j2\pi kn/N} \quad (6)$$

Accordingly, each element $s'_{fn}(i)$ of the peak-reduced input signal $S'_f(i)$ to the inverse Fourier transform part 13 that is generated by the subtractors $24_0$ to $24_{N-1}$ is expressed by $$s'_{fn}(i) = S_{fn}(i) - U_{fn}(i) \quad (7)$$

As referred to above, this updated input signal $S'_f(i)$ to the inverse Fourier transform part 13 is repeatedly subjected to processing of Eqs. (3), (5), (6) and (7) until every peak component $U_t(i)$ defined by Eq. (5) becomes zero.

In the OFDM system, for example, when a signal by another user is mixed in the band, interference can be avoided by inhibiting the signal output to that output end of the serial-to-parallel converting part 12 corresponding to the frequency of the mixed signal and by setting the corresponding input to the inverse Fourier transform part 13 at zero. In this instance, since not all of the sub-carrier components is used, a peak component exceeding the permissible peak level may sometimes remain unreduced by only one iterate of peak reduction processing. By repeating the peak reduction processing as in the present invention, however, the peak power can be reduced to a value equal to or lower than the permissible peak level. Further, as is evident from the above-described peak reduction procedure, the number of sub-carriers in OFDM is not limited.

Figure 3:
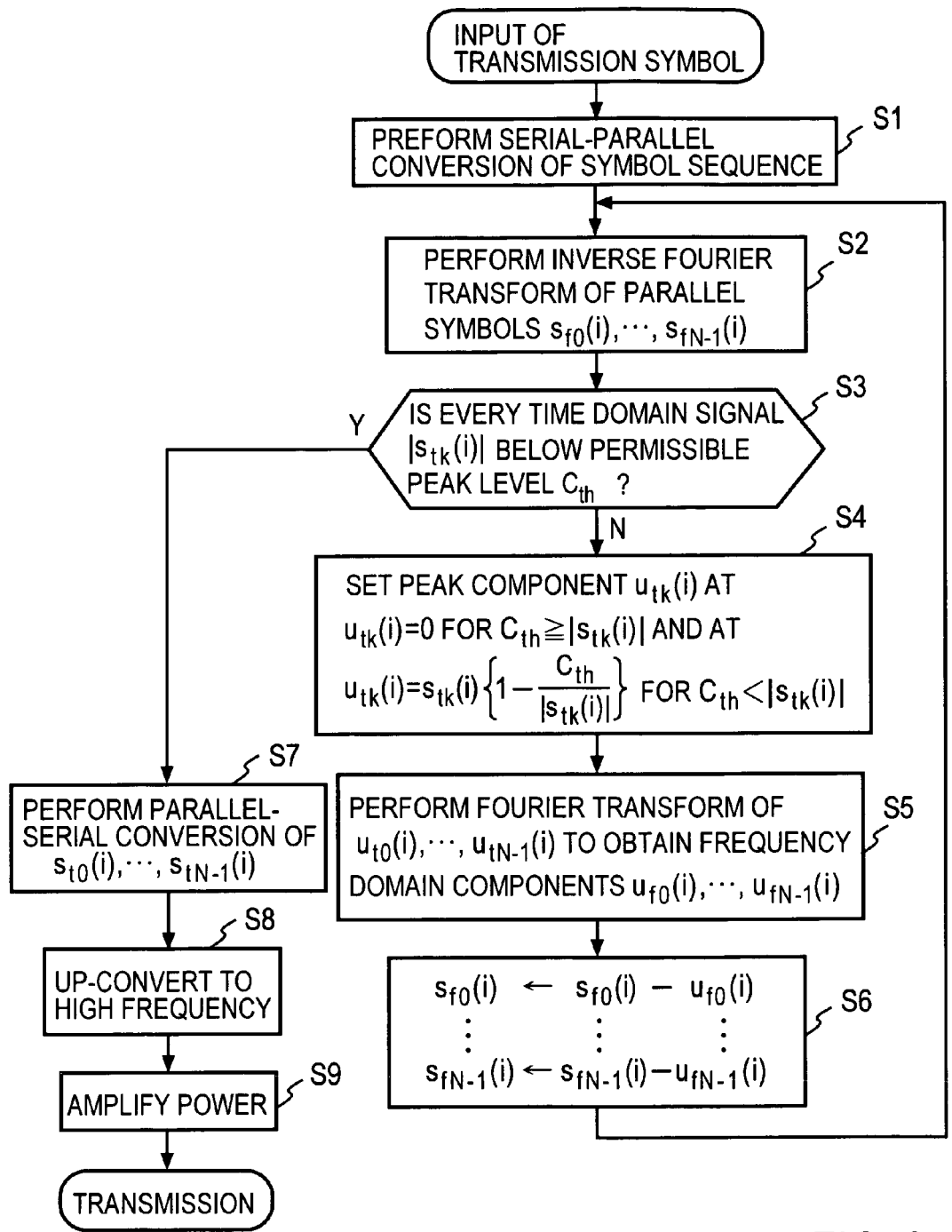
FIG. 3 is a flowchart showing the transmitting procedure by the transmitting apparatus of FIG. 1.

FIG. 3 shows the procedure of the transmission method that performs peak reduction processing in the FIG. 1 embodiment.

Step S1: Perform serial-to-parallel conversion of the input symbol sequence of the symbol period T to be transmitted to obtain N sub-carrier signal components $s_{f0}(i)$, $s_{f1}(i), \ldots, s_{fN}(i)$ of the frequency interval 1/T.

Step S2: Perform inverse Fourier transform processing of the sub-carrier signals $s_{f0}(i), s_{f1}(i), \ldots, s_{fN-1}(i)$ to obtain time domain signal components $s_{t0}(i), s_{t1}(i), \ldots, s_{tN-1}(i)$.

Step S3: Make a check to see if the level $|S_{tk}(i)|$ of every time domain signal component is equal to or lower than the permissible peak level $C_{th}$, where k=0, 1, ..., N-1.

Step S4: If the level $|s_{tk}(i)|$ of even one signal component is larger than $C_{th}$, obtain the peak component $u_{tk}(i)$ by Eq. (5).

Step S5: Perform Fourier transform processing of the thus obtained peak components $u_{t0}(i), u_{t1}(i), \ldots, u_{tN-1}(i)$ to obtain frequency domain components $u_{f0}(i), u_{f1}(i), \ldots, u_{fN-1}(i)$ of the peak component.

Step S6: Subtract the frequency domain components $u_{f0}(i)$, $u_{f1}(i), \ldots, u_{fN-1}(i)$ of the peak component from the sub-carrier signal components $s_{f0}(i), s_{f1}(i), \ldots, s_{fN-1}(i)$, then set the subtraction result as updated sub-carrier signal components $s_{f0}(i), s_{f1}(i), \ldots, s_{fN-1}(i)$, and return to step S2.

Step S7: When it is decided in step S3 that the level $|s_{tk}(i)|$ of every time domain signal component is equal to or lower than the permissible peak level $C_{th}$, perform parallel-to-serial conversion of the time domain signal components $s_{t0}(i), s_{t1}(i), \ldots, s_{tN-1}(i)$ at that time to a time-series signal.

Step S8: Up convert the time-series signal by a carrier of a frequency $f_c$, to generate a high-frequency signal.

Step S9: Power-amplify and transmit the high-frequency signal.

As described above, what is important and characteristic of the present invention is to repeat more than once or more as required the loop of: detecting that peak components of the time domain signals obtained by inverse Fourier transform processing which exceed the permissible peak level; performing Fourier transform processing of these peak components to obtain frequency domain components; and subtracting the frequency domain components from the subcarrier signal components of the corresponding frequencies.

Figure 4:
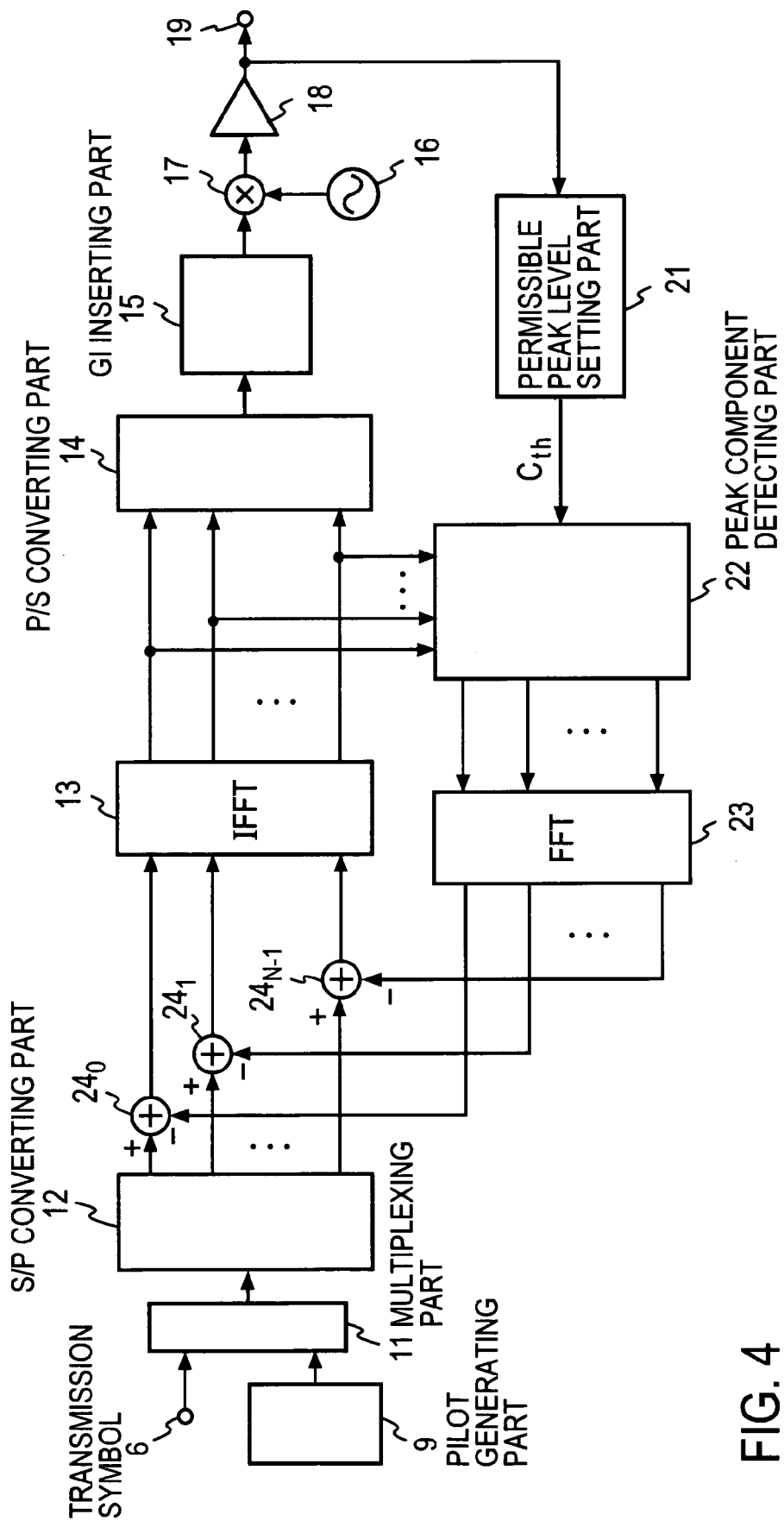
FIG. 4 is a block diagram showing a modified form of the FIG. 1 embodiment.

FIG. 4 illustrates a modified form of the first embodiment shown in FIG. 1. The illustrated modification differs from the first embodiment in that the permissible peak level $C_{th}$, which is relative to the average power, is changed with the transmitting output from the power amplifier 18. This embodiment is identical in construction with the FIG. 1 embodiment except the above.

The peak power reduction method of the present invention normally employs baseband processing. On this account, the permissible peak level $C_{th}$, which is used for peak power reduction processing, is set as a value relative to the average transmitting power, not as an absolute value that is actually output from the transmitting power amplifier 18. In mobile communications, the transmitting output is usually changed with a change in the received level that is caused by the position of the mobile station. Accordingly, when the permissible peak level $C_{th}$ is set as a relative value as mentioned above, the absolute value of the permissible peak level varies with the transmitting output.

On the other hand, when the transmitting output is sufficiently smaller than the maximum output of the transmitting power amplifier 18, even if the use of OFDM creates a larger peak power, power consumption is not so large in some cases. Since the reduction of peak power usually leads to deterioration of received characteristics, there are cases where it is advantageous from the viewpoint of the entire system configuration to suppress the reduction of peak power when the transmitting power is small.

In view of the above, the FIG. 4 modified embodiment constructs an efficient system by use of the permissible peak level setting part 21 by which the permissible peak level $C_{th}$ relative to the average transmitting power is set at a small value when the transmitting power is large and at a relatively large value when the transmitting power is small.

SECOND EMBODIMENT

Figure 5:
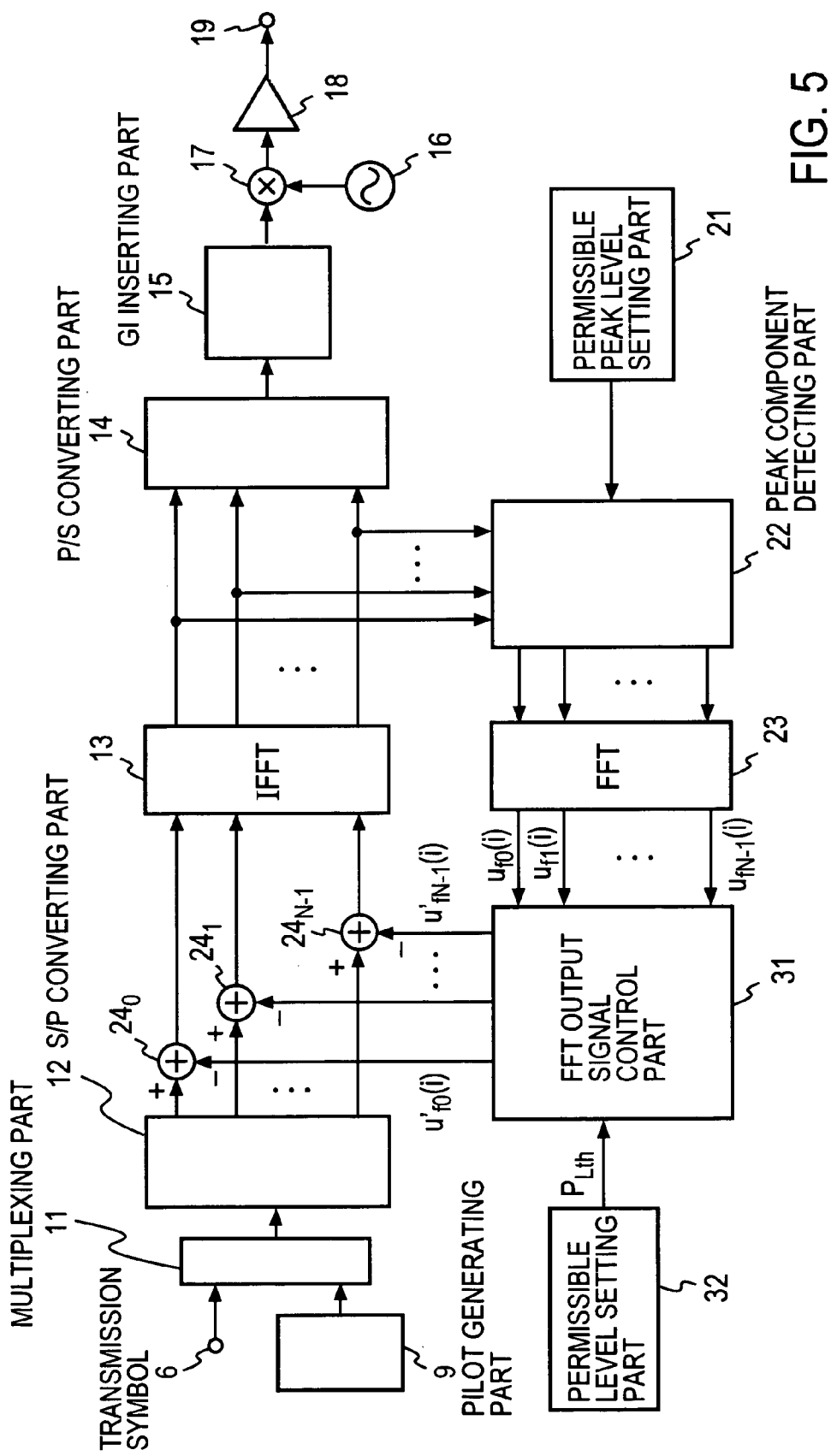
FIG. 5 is a block diagram illustrating a second embodiment of the present invention.
Figure 6:
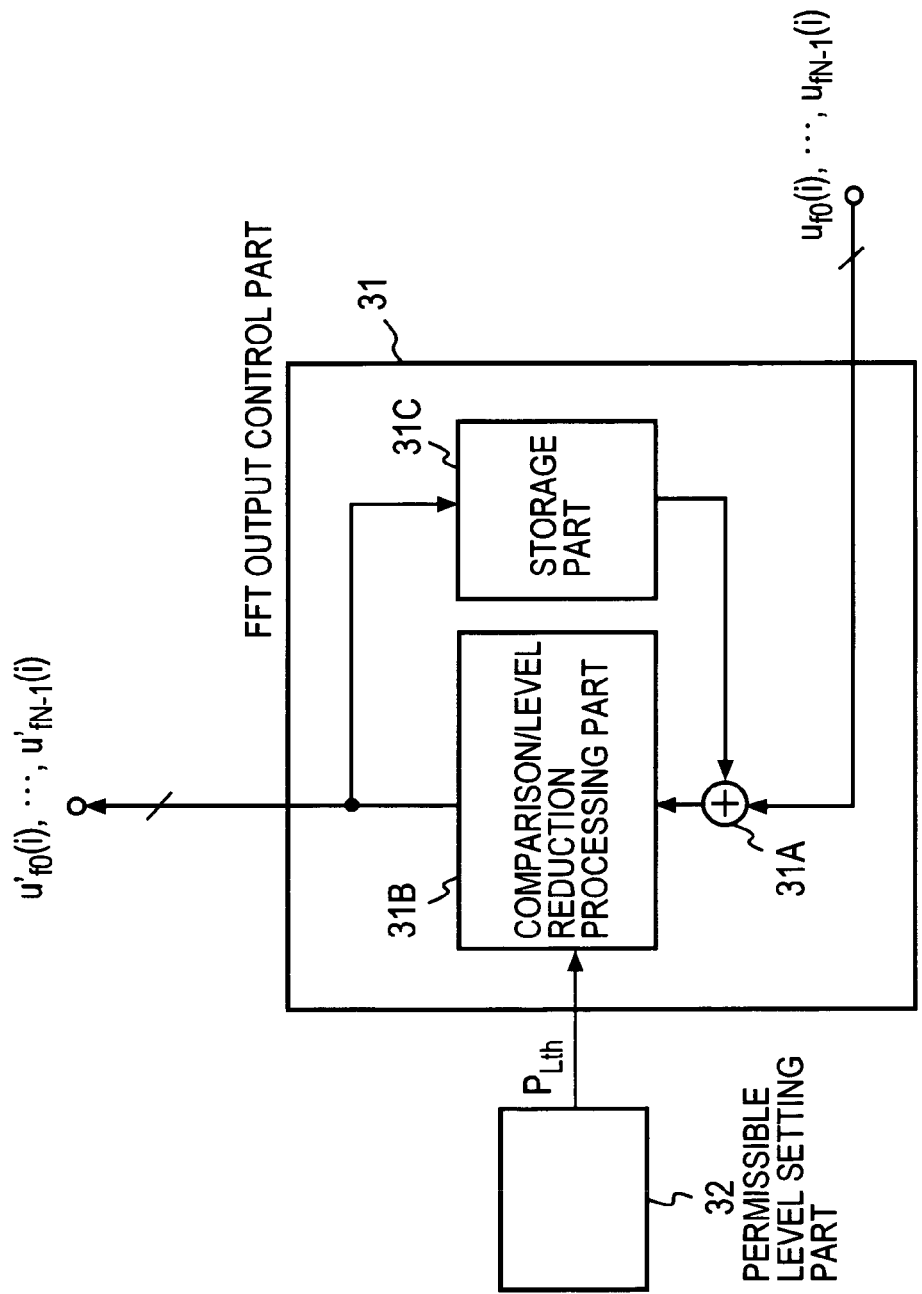
FIG. 6 is a block diagram showing the configuration of an FFT output control part in the FIG. 5 embodiment.

FIG. 5 illustrates a second embodiment of the present invention. This embodiment differs from the embodiments of FIGS. 1 and 4 in the provision of a Fourier-transformed output control part 31 for controlling the value of the Fourier-transformed output signal in accordance with the peak-reduced-signal permissible level, and a permissible level setting part 32 for setting the peak-reduced-signal permissible level $P_{Lth}$ in the Fourier-transformed output control part 31. The Fourier-transformed output control part 31 has, as shown in FIG. 6, an adder 31A, a comparison/level reduction processing part 31B, and a storage part 31C.

In the present invention, respective outputs $u_{f0}(i), \ldots, u_{fN-1}(i)$ from the Fourier transform part 2 correspond to the peak-reduced signals that are inserted in respective sub-carrier signals. This embodiment controls the level of the peak-reduced signal by the Fourier transform output control part 31 for each sub-carrier, thereby lessening the influence on received characteristics.

Figure 7A:
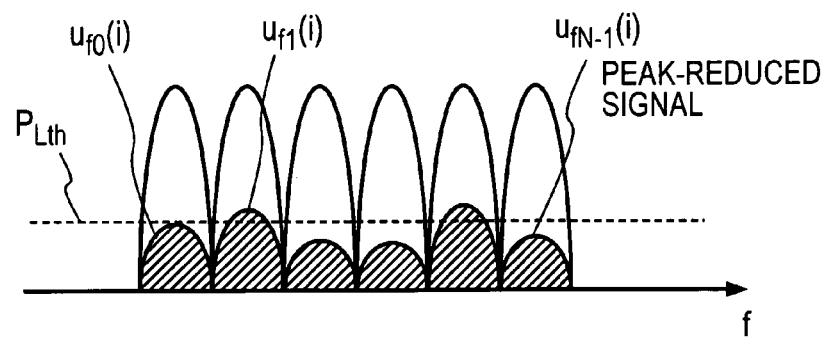
FIG. 7A is a diagram depicting examples of peak-reduced signals.
Figure 7B:
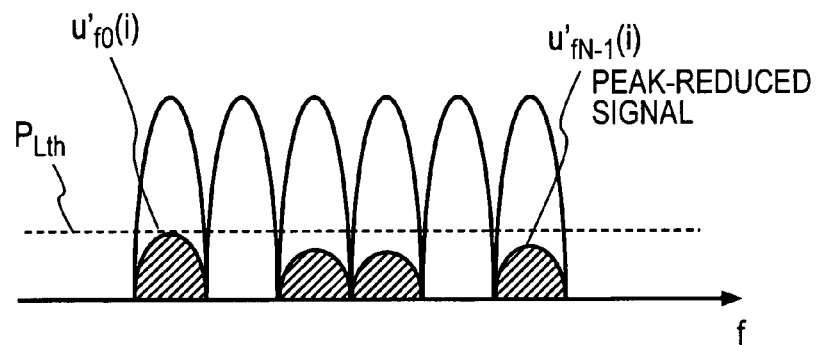
FIG. 7B is a diagram depicting examples of peak-reduced signals after peak level suppression.
Figure 7C:
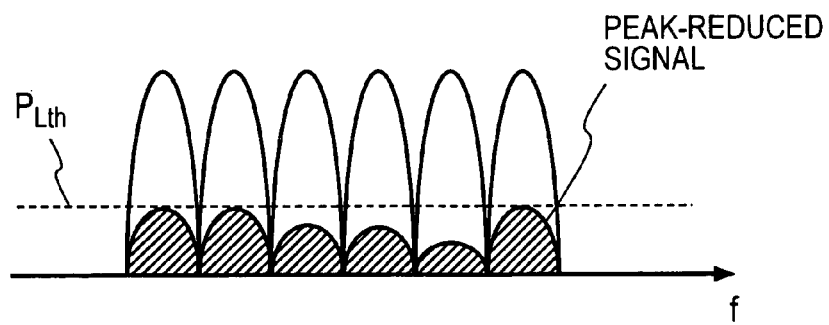
FIG. 7C is a diagram depicting examples of peak-reduced signals repeatedly subjected to peak level suppression.

In the case of applying the peak power reduction method of the present invention to the OFDM signal, the levels of resulting peak-reduced signals $u_{f0}(i), \ldots, u_{fN-1}(i)$ vary from sub-carrier to sub-carrier as depicted in FIG. 7A. In this case, the generation of a peak-reduced signal larger than the signal power will degrade the corresponding sub-carrier receiving characteristics. In this embodiment, as shown in FIG. 6, the permissible level setting part 32 sets the peak-reduced-signal permissible level $P_{Lth}$, and the comparison/level reduction processing part 31B compares, for each sub-carrier, the peak-reduced-signal permissible level $P_{Lth}$ and each of the generated peak-reduced signals $u_{f0}(i), \ldots, u_{fN-1}(i)$; when the level of a peak-reduced signal exceeds the peak-reduced-signal permissible level $P_{Lth}$, the peak-reduced signal of the sub-carrier concerned is set at zero or a level equal to or lower than the peak-reduced-signal permissible level $P_{Lth}$. An example of the peak-reduced signal in this case is shown in FIG. 7B. The thus processed peak-reduced signals $u'_{f0}(i), \ldots, u'_{fN}-1(i)$ are stored in the storage part 31C in FIG. 6, and these signals are subtracted by the subtracting parts $24_0, \ldots, 24_{N-1}$ from the input signals to the inverse Fourier transform part 13 to thereby suppress the peak power of the output signal from the inverse Fourier transform part 13.

In this instance, since the peak-reduced signals of some sub-carriers are set at zero, a peak component exceeding the permissible peak level occurs again. Then, this residual peak component is detected and Fourier-transformed again, and this Fourier-transformed output signal is added to the corresponding peak-reduced signal stored in the storage part 31C. The peak-reduced signal added with the Fourier-transformed output signal and the peak-reduced-signal permissible level $P_{Lth}$ are compared again for each sub-carrier in the comparison/level reduction processing part 31B, and the peak-reduced signal of that sub-carrier is set at zero or a level equal to or lower than the peak-reduced-signal permissible level $P_{Lth}$.

By repeating the above signal processing, it is possible to suppress the level of the peak-reduced signal to be inserted for each sub-carrier and to suppress the peak power of the transmitting signal.

While in the above description the perk-reduced-signal permissible level is common to all the sub-carriers, it may be set at a different value for each sub-carrier as described below.

Figure 8A:
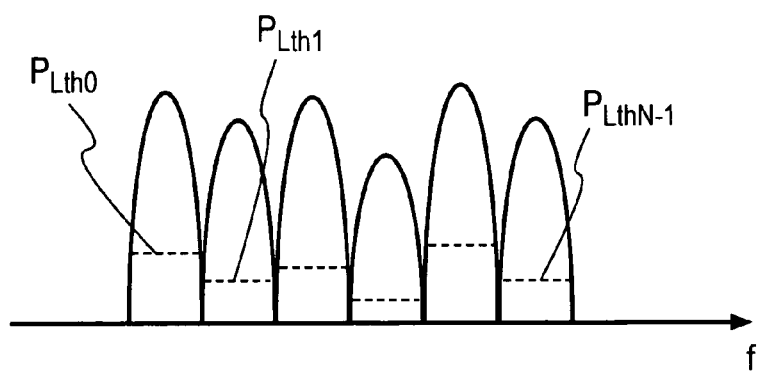
FIG. 8A is a diagram depicting plural different permissible levels for the peak-level-reduced signals.

In the mobile communication, transmitting power control is aimed at improving the receiving characteristics and increasing the system capacity, and in the OFDM transmission, too, it is now under study to change the transmitting power for each sub-carrier in accordance with the condition of the transmission line. When the transmitting power differs for each sub-carrier as mentioned above, degradation of the receiving characteristics can be prevented by lowering the peak-reduced-signal permissible level for the sub-carrier of small transmitting power. For example, as shown in FIG. 8A, the peak-reduced-signal permissible levels $P_{Lth0}, \ldots, P_{LthN-1}$ may be set so that S/N of the transmitting signal becomes constant.

Figure 8B:
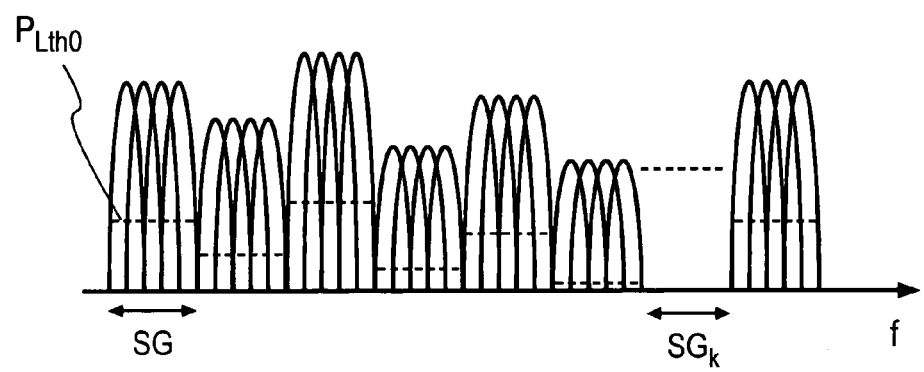
FIG. 8B is a diagram depicting examples of permissible levels for peak-reduced signals, set for each segment.

On the other hand, as regards the transmitting power control for OFDM transmission, it is also possible to employ such a method as shown in FIG. 8B, which breaks down the OFDM signal into Ns ($2 \leq Ns \leq N-1$) segments $SG_1, \ldots, SG_{Ns}$ and controls the transmitting power for each segment. In this case, it is effective to adopt a scheme that does not send signals for the segment, for example, $SG_k$, corresponding to the transmission line of bad conditions, but instead allocates the resulting excess transmitting power to other segments corresponding to transmission lines of good conditions. In such a transmission mode, by raising the peak-reduced-signal permissible level $P_{Lthk}$ in the frequency band of the segment for which no signal is sent, and by gathering peak-reduced signals in this band, it is possible to lower the level of each peak-reduced signal in the band in which the signal is sent—this permits further suppression of deterioration of the receiving characteristics.

THIRD EMBODIMENT

Figure 9:
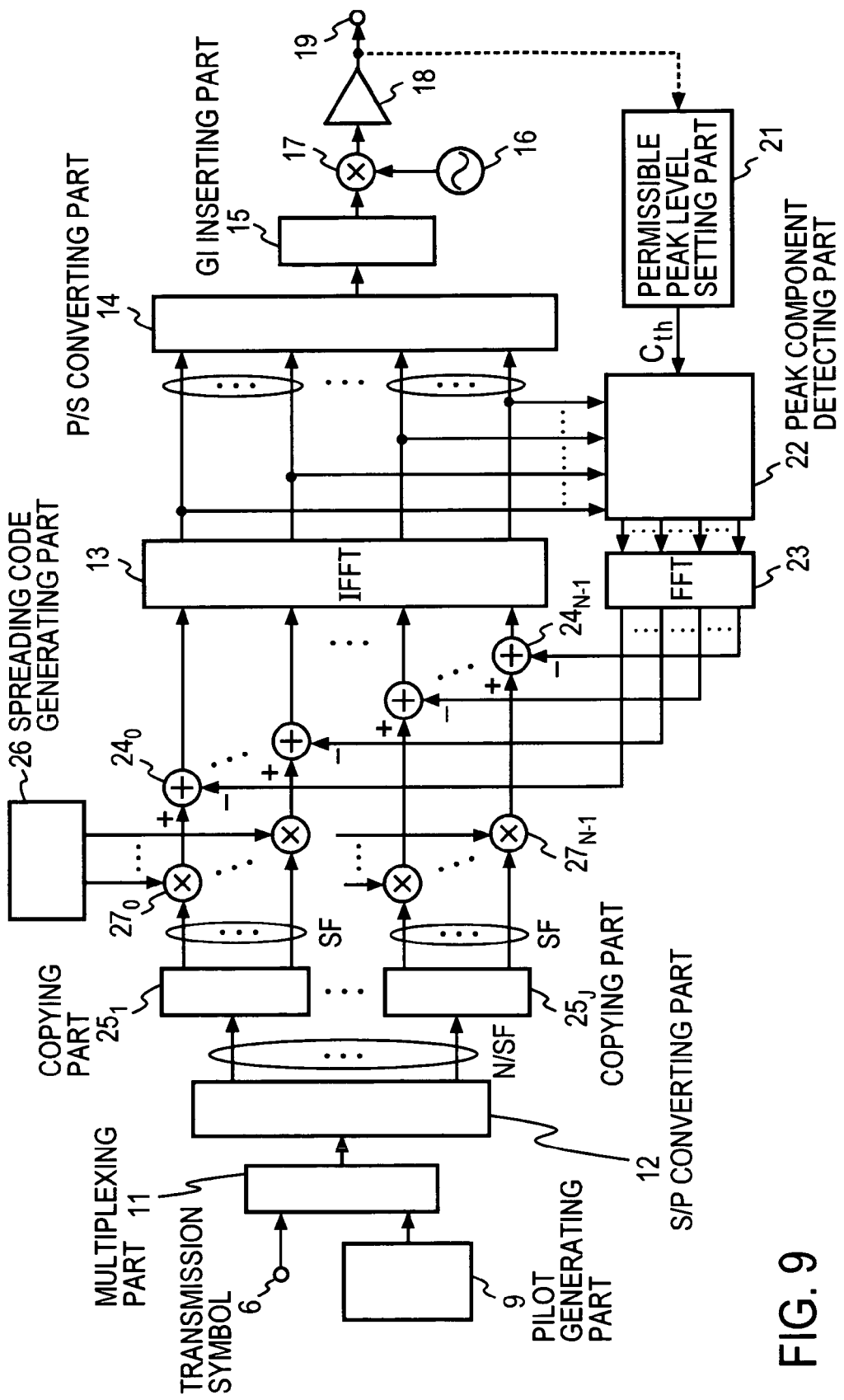
FIG. 9 is a block diagram illustrating an embodiment of the transmitting apparatus according to the present invention which uses OFCDM.

While in the above the present invention has been described as being applied to the transmitting apparatus using OFDM, FIG. 9 shows a third embodiment of the invention applied to OFCDM. This embodiment has a configuration wherein, in the FIG. 1 embodiment, copying parts $25_1$ to $25_J$ are connected to J=N/SF parallel outputs of the serial-parallel converting part 12 and SF copied outputs from each copying part $25_j$ ($1 \leq j \leq J$, $J \times SF = N$) are multiplied by multiplies $27_0$ to $27_{N-1}$ by a spreading code from a spreading code generating part 26 and provided to the adders $24_1$, to $24_{N-1}$; this embodiment is substantially identical with the FIG. 1 embodiment except the above configuration. In this embodiment, however, the pilot generating part 9 and the multiplexing part 11 are provided, and the multiplexing part 11 inserts pilot symbols into the transmitting symbol sequence, and provides the output to the serial-parallel converting part 12. SF is called spreading factor, which is an integer equal to or greater than 1.

In the OFCDM system the outputs from the copying parts $25_1$ to $25_J$ are spread by a user-specific short code and a long code specific to the cell to which the base station using the transmitting apparatus belongs. In the FIG. 9 embodiment, the spreading code generating part 26 generates, as the spreading code, the result of multiplication of the short code and the long code, and provides one chip to each of the multipliers $27_0$ to $27_{N-1}$ every N chips for multiplication by the N outputs from the copying parts $25_1$ to $25_{N-1}$, and the multiplied outputs are provided to the corresponding ones of the adders $24_0$ to $24_{N-1}$, respectively. The subsequent peak reduction processing is the same as in the FIG. 1 embodiment, and as indicated by the broken line, the set value of the permissible peak level $C_{th}$ in the permissible peak level setting part 21 may be changed with the average power of the high-frequency power amplifier 18 as in the case of the FIG. 4 embodiment.

In the FIG. 9 embodiment, too, the total number of outputs from the copying parts $25_1$ to $25_J$ is N=J·SF, and for the symbol period T of the input to the serial-to-parallel converting part 12, N outputs from these copying parts are handled as sub-carrier signal components of the frequency interval 1/T. In this embodiment, setting the spreading factor SF at an integer equal to or greater than 1 and equal to or smaller than N, the input symbol sequence is converted by the serial-to-parallel converting part 12 to J=N/SF parallel symbols, and each of these J outputs is copied by the copying part $25_j$ to a number of SF copies, which are transmitted as SF sub-carrier signal components. Accordingly, if SF is equal to or greater than 2, it is possible to obtain the diversity effect at the receiving side, but the signal transmission rate is reduced accordingly.

The transmission procedure by the transmitting apparatus of the FIG. 9 embodiment can be carried out by adding steps of copying each symbol to a number of SF copies and spreading a total of N thus generated symbols by a spreading code to the FIG. 3 procedure after the serial-to-parallel conversion in step S1. The thus spread N symbols are used as N sub-carrier signal components $s_{f0}(i)$ $s_{f1}(I), \ldots, s_{fN-1}(i)$, and the added steps are followed by step S2 to the end in FIG. 3.

Figure 10:
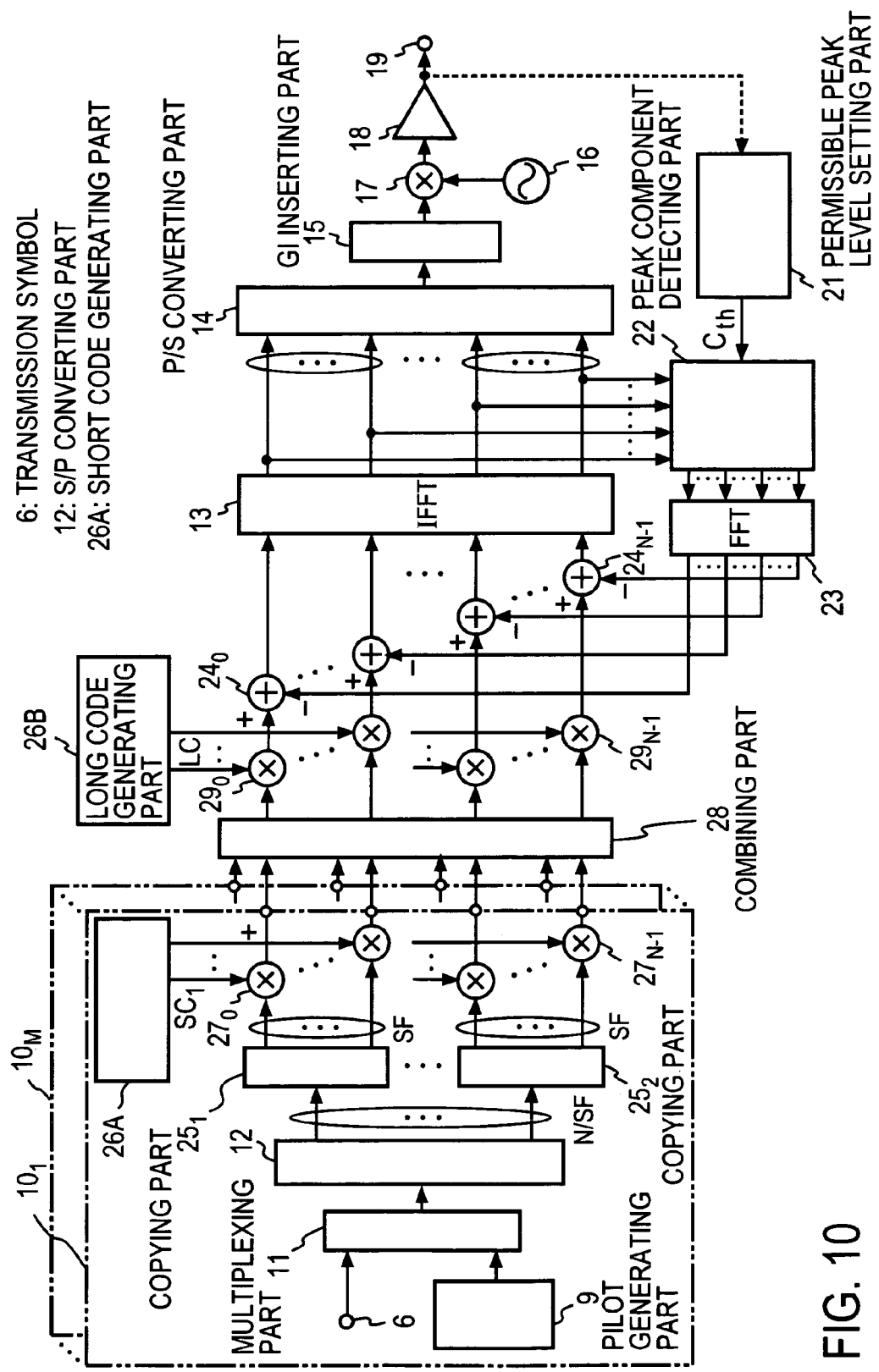
FIG. 10 is a block diagram illustrating a modified form of the FIG. 9 embodiment.

An embodiment of FIG. 10 is an embodiment of an OFCDM communication apparatus which uses plural routes from the data input terminal 6 to the serial-to-parallel converting part 12 in the FIG. 9 embodiment and spreads the outputs from those plural routes by different spreading codes, thereby permitting the use of a plurality of the same sub-carrier sets.

As illustrated in FIG. 10, in this embodiment there are provided in the configuration of the FIG. 9 embodiment M similarly-configured sub-carrier generating parts $10_1$ to $10_M$ each containing the pilot generating part 9, the multiplexing part 11, the serial-to-parallel converting part 12, the copying parts $25_1$ to $25_J$ and the multipliers $27_0$ to $27_{N-1}$. The M is an integer equal to or greater than 2. Further, each sub-carrier generating part $10_m$ ($1 \leq m \leq M$) has a short code generating part 26A in this example, and the short code generating parts 26A of the respective sub-carrier generating parts $10_1$ to $10_M$ generates different short codes $SC_1$ to $SC_M$ of the same code length. Each short code generating part 26A provides the short code $SC_m$ to the multipliers $27_0$ to $27_{N-1}$ on a chip-by-chip basis.

The outputs from the multipliers $27_0$ to $27_{N-1}$ of each of the M sub-carrier generating parts $10_1$ to $10_M$ are applied to a combining part 28, wherein the corresponding sub-carrier signal components are respectively combined into N combined sub-carrier signal components, which are provided to multipliers $29_0$ to $29_{N-1}$. The long code generating part 26B generates a long code LC, and provides one chip to each of the multipliers $29_0$ to $29_{N-1}$ every N chips for multiplication by the N outputs from the combining part 28, and the multiplied outputs are applied to the N subtractors $24_0$ to $24_{N-1}$. The subsequent peak reduction processing is the same as in the case of the FIG. 1 embodiment, and as indicated by the broken line, the permissible peak level may be changed with the average power of the power amplifier 18 as is the case with the FIG. 4 embodiment.

Further, in the FIG. 10 embodiment, the short code generating part 26A may be replaced with the spreading code generating part 26 that multiplies the short and long codes to provide the multiplied output, in which case the long code generating part 26B and the multipliers $29_0$ to $29_{N-1}$ can be omitted.

The FIG. 10 embodiment enables a plurality of users to use the N sub-carriers of the same set, and hence it has the advantage of high frequency utilization efficiency. Moreover, in the above embodiment the value of the spreading factor SF may be changed with the delay spread by the multi-path—this indicates that the peak reduction scheme by the present invention is applicable to the VSF-OFCDM (Variable Spreading Factor-Orthogonal Frequency and Code Division Multiplexing) system now under study as a fourth-generation mobile communication system.

In the transmitting procedure of the FIG. 10 embodiment, in step S1 of the FIG. 3 procedure the input symbols of the plural routes are converted from serial to parallel form for each route, then the thus converted parallel symbols are copied into a number of N symbols, which are spread by spreading codes, and the corresponding spread symbols of the plural routes are combined to obtain N combined spread symbols as N sub-carrier signal components $s_{f0}(i), s_{f1}(i), \ldots, s_{fN-1}$. This is followed by step S2 to the end in FIG. 3.

In the above-described embodiments of FIGS. 1, 4, 9 and 10, since the values that each symbol can assume are predetermined, letting the number of such possible values be represented by K, the number of combinations of the N parallel outputs from the serial-to-parallel converting part 12 is $K^N$. Since these combinations are predetermined, it is possible to precalculate the inverse Fourier transform for the respective combinations and prestore the calculated values in a memory and read out therefrom the inverse Fourier transform values corresponding to the N input signals to the inverse Fourier transform part 13. In such an instance, the inverse Fourier transform part 13 itself is formed by a memory. The Fourier transform part 23 may also be formed by a memory.

Furthermore, since combinations of the values that th inverse Fourier transform outputs can assume are also predetermined, predetermination of the permissible peak level $C_{th}$ enables precalculation of the peak component by Eq. (5); accordingly, if a set of N outputs from the serial-to-parallel converting part 12 (or a set of N inputs to the inverse Fourier transform part 13) is given, it is possible to precalculate the final outputs from the inverse Fourier transform part 13 that would be obtained in the case of repeatedly performing the peak reduction processing until the detected peak becomes equal to or lower than the permissible peak level $C_{th}$.

Hence, it is also possible to adopt a configuration in which: the outputs from the inverse Fourier transform part 13 provided by the peak reduction processing are prestored in a memory in correspondence to the respective sets of outputs from the serial-to-parallel conversion part 12 (or inputs to the inverse Fourier transform part 13); and during operation of the transmitting apparatus the inverse Fourier transform results after the peak reduction processing, corresponding to the outputs from the serial-to-parallel converting part 12 (the outputs from the multipliers $24_0$ to $24_{N-1}$ in FIGS. 9 and 10), are read out from the memory and fed to the parallel-to-serial converting part 14. In such a case, the inverse Fourier transform part 13, the peak component detecting part 22, the Fourier transform part 23 and the subtractors $24_0$ to $24_{N-1}$ in FIGS. 1, 4, 9 and 10 are formed in their entirety by one memory.

First Embodiment of Receiving Apparatus

Figure 11:
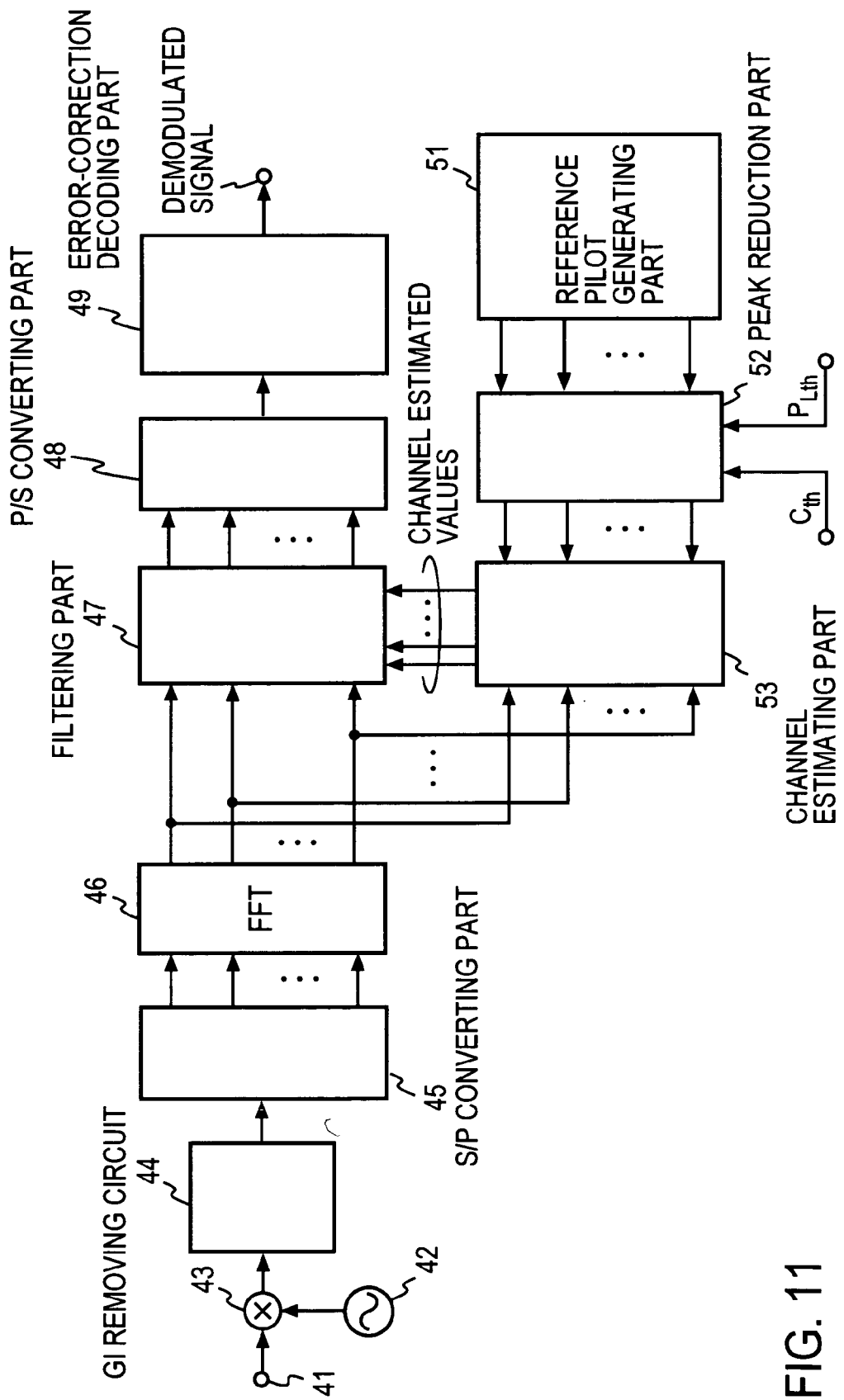
FIG. 11 is a block diagram illustrating a first embodiment of a receiving apparatus adapted for use with the transmitting apparatus of the present invention.

FIG. 11 illustrates an example of the configuration of a receiving apparatus adapted for use with the transmitting apparatus according to the present invention. As is the case with an ordinary OFDM signal receiver, the illustrated receiving apparatus is provided with a local oscillator 42, a down-converting mixer 43, a guard interval removing circuit 44, a serial-to-parallel converting part 45, a Fourier transform part 46, a filtering part 47, a parallel-to-serial converting part 48, an error-correction decoding part 49, a reference pilot generating part 51, and a channel estimating part 53. In this embodiment there is further provided a peak reduction part 52 between the reference pilot generating part 51 and the channel estimating part 53.

An OFDM signal fed to a terminal 41 is converted by the down-converting mixer 43 by a local signal from the local oscillator 42 to a base band signal (or intermediate-frequency signal), then the guard interval is removed by the guard interval removing circuit 44 from the base band signal, and it is converted by the serial-to-parallel converting part 45 to parallel signals, which are subjected to Fourier transform processing in the Fourier transform part 46. The output signals from the Fourier transform part 46 are each provided as a received signal for each sub-carrier. In the filtering part 47 channel transmission distortions are removed from these sub-carrier received signals, then the signals are converted by the parallel-to-serial converting part 48 to a serial signal, which is subjected to error-correction decoding in the error-correction decoding part 49 to demodulate the original signal.

In the channel estimating part 53, during the pilot duration during which a signal pattern known to the receiving side is transmitted a channel estimation is made using a reference pilot signal from the reference pilot generating part 51 and the sub-carrier received signals. The channel estimation method for use in this case is, for example, to correlate the received signal and the reference pilot signal for each sub-carrier and obtain by calculation from the correlation, as a channel estimated value, filter coefficients representing inverse characteristics of the transmission characteristics of each channel, for example, FIR filter coefficients.

Since the transmitting side performs peak reduction processing as described previously with reference to FIGS. 1, 4 and 5, the received pilot signal of each sub-carrier is affected by the peak reduction processing as well as by the channel transmission characteristics. In view of this, in the receiving apparatus of FIG. 11 the reference pilot signal generated at the receiving side is also subjected to the same peak reduction processing as at the transmitting side to thereby increase the accuracy of the channel estimation in the channel estimating part 53.

Figure 12:
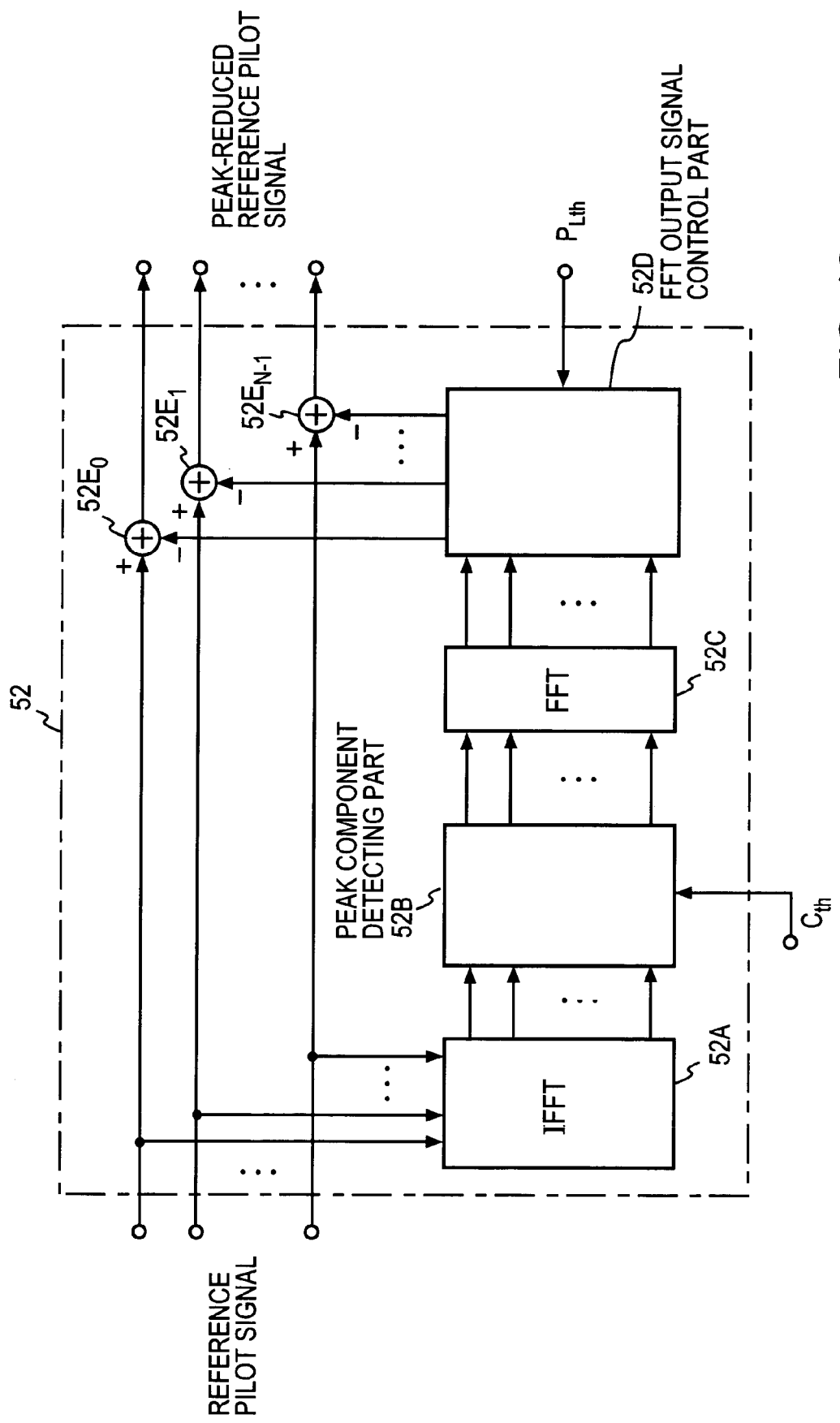
FIG. 12 is a block diagram showing an example of the configuration of a peak reduction part 52 in FIG. 11.

FIG. 12 illustrates an example of the configuration of the peak reduction part 52. The constituent elements of this example are identical in construction and operation with the inverse Fourier transform part 13, the peak component detecting part 22, the Fourier transform part 23, the Fourier-transformed output signal control part 31, and the subtractors $24_0$ to $24_{N-1}$ in the transmitting apparatus of FIG. 5; the reference pilot signals from the reference pilot generating part 51 are subjected to inverse Fourier transform processing in an inverse Fourier transform part 52A, then peak components of the transformed outputs are detected in a peak component detecting part 52B, and those components under the permissible peak level $C_{th}$ are all set at zeros. The outputs from the peak component detecting part 52B are Fourier-transformed in a Fourier transform part 52C, then the transformed outputs are compared with the peak-reduced-signal permissible level $P_{Lth}$ in a Fourier-transformed output signal control part 52D, and a component exceeding the permissible level is replaced with a predetermined value (the same value as that at the transmitting side) smaller than $P_{Lth}$. The outputs from the Fourier-transformed output signal control part 52D are subtracted by subtractors $52E_0, \ldots, 52E_{N-1}$ from the reference pilot signals. The above processing is repeated until the detected levels of all components by the peak component detecting part 52B become equal to or lower than the permissible peak level $C_{th}$, by which the same peak reduction processing as that for the pilot signal at the transmitting side is also carried out for the reference pilot signal at the receiving side. Accordingly, the difference between the sub-carrier received pilot signal applied to the channel estimating part 53 in FIG. 11 and the peak-reduced reference pilot signal fed thereto from the peak reduction part 52 is only the distortion of the received pilot on the transmission line; hence, the channel estimation accuracy in the channel estimating part 53 can be enhanced.

The channel estimating part 53 calculates, for each of the N channels, the correlation between the sub-carrier received pilot signal and the reference pilot signal subjected to the peak reduction processing in the peak reduction part 52, and calculates from the correlation, as a channel estimated value, for example, FIR filter coefficients representing the transmission line characteristics. The filtering part 47 calculates, from the filter characteristics of each channel, coefficients indicating inverse characteristics of the transmission line characteristics, and uses the inverse characteristic coefficients to perform FIR filtering of the sub-carrier received signal of the corresponding channel, thereby removing the transmission distortion from the received signal. The outputs from the filtering part 47 are converted by the parallel-to-serial converting part 48 to a serial signal, which is subjected to error-correction decoding in the error correction decoding part 49.

With this receiving apparatus, during channel estimation the influence of the peak reduction processing, to which the received pilot signal was subjected at the transmitting side, is excluded to ensure accurate channel estimation, enabling the peak permissible level $P_{Lth}$ to be set high at the transmitting side accordingly. Since the amount of peak reduction can be increased in the transmitting apparatus, it is possible to decrease the backoff in the high-frequency power amplifier 18 correspondingly, permitting high-efficiency power amplification.

In the case where the peak-reduced signal, which is the Fourier-transformed output, is subjected to various kinds of control processing at the transmitting side, the same processing as at the transmitting side needs only to be performed by the Fourier-transformed output signal control part 52D shown in FIG. 12.

Second Embodiment of Receiving Apparatus

Figure 13:
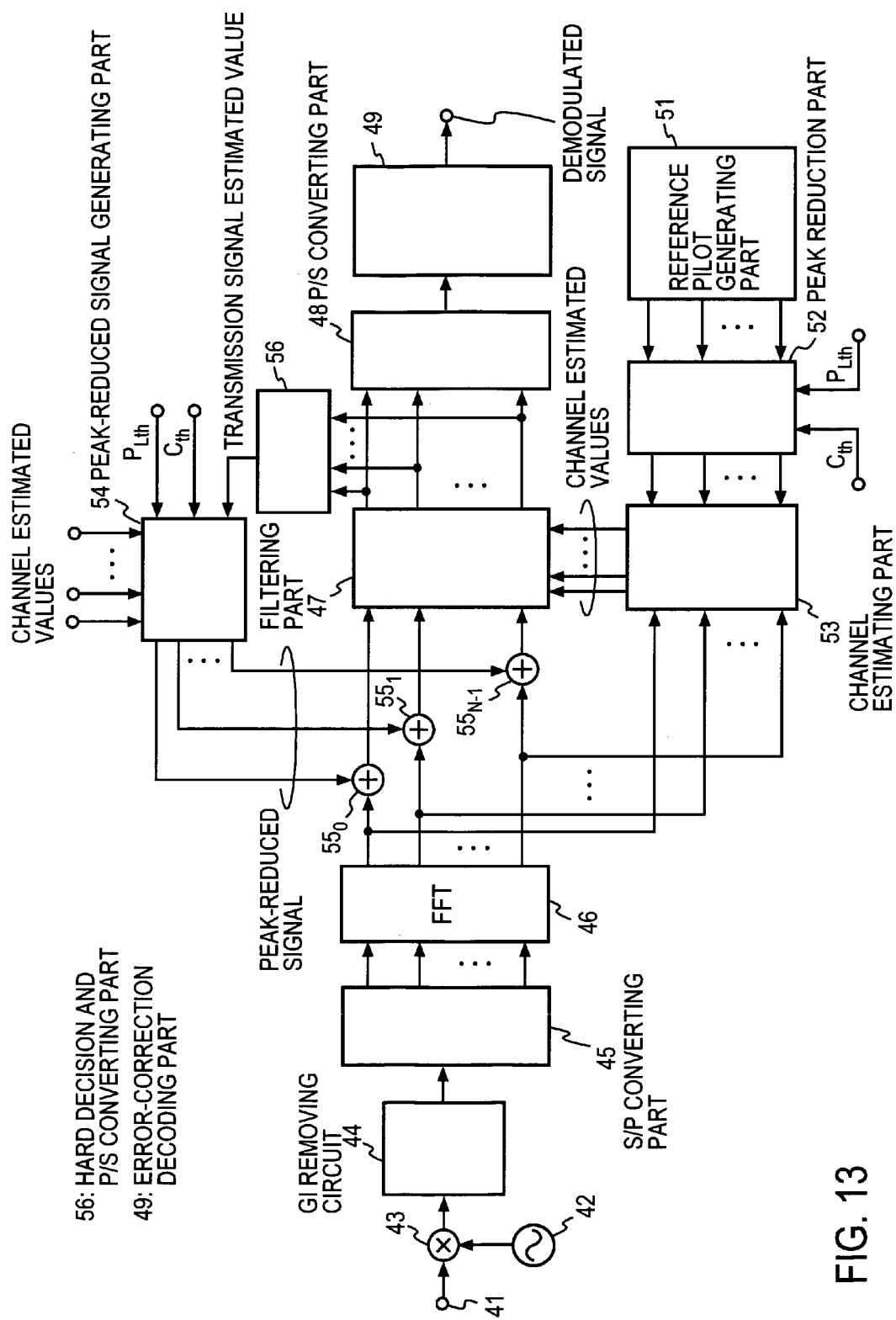
FIG. 13 is a block diagram illustrating a second embodiment of the receiving apparatus adapted for use with the transmitting apparatus of the present invention.

The FIG. 11 embodiment has been described as being configured to perform, for the reference pilot signal, the same peak reduction processing as that at the transmitting side so as to ensure accurate channel estimation, but since the transmitting apparatuses of FIGS. 1, 4 and 5 perform the peak reduction processing over the entire duration of the transmitting signal, the received signal is a peak-reduced signal, that is, a signal having its received characteristics deteriorated accordingly. If the characteristic deterioration is within permissible limits, the signal can be used intact; the second embodiment shown in FIG. 13 is configured to compensate for the characteristic degradation caused by the peak reduction processing at the transmitting side. That is, as depicted in FIG. 13, a peak-reduced signal generating part 54, adders $55_0, \ldots, 55_{N-1}$, and a hard decision/parallel-to-serial converting part 56 are additionally provided in the FIG. 11 configuration. The hard decision/parallel-to-serial converting part 56 makes hard decisions on the outputs from the filtering part 47 and converts them from parallel to serial form and outputs a transmitted signal estimated value . Then peak-reduced signals generated from this transmitted signal estimated value in the peak-reduced signal generating part 54 are added by the adders $55_0, \ldots, 55_{N-1}$ to the respective sub-carrier received signals outputted from the Fourier transform part 46.

Figure 14:
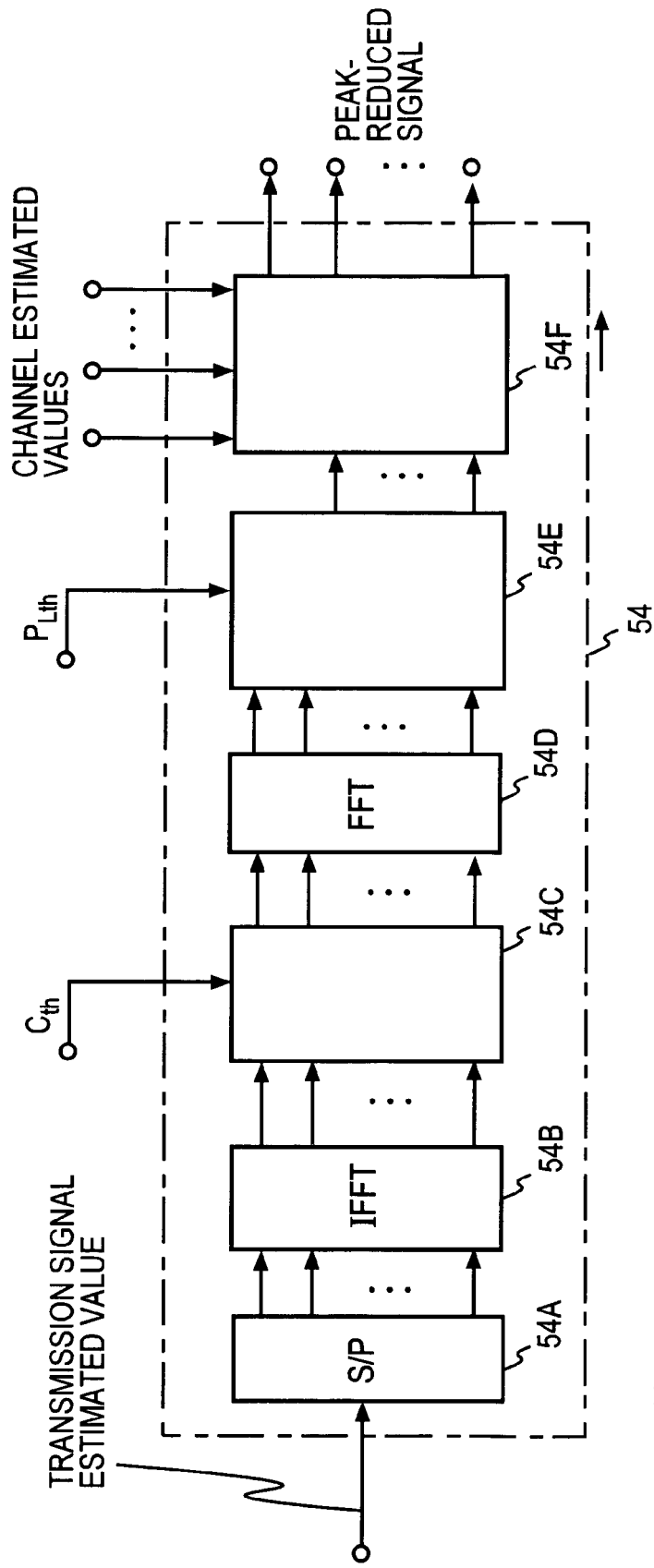
FIG. 14 is a block diagram showing an example of the configuration of a peak-reduced signal generating part 54 in FIG. 13.

In FIG. 14 there is shown an example of the configuration of the peak-reduced signal generating part 54. A serial-to-parallel converting part 54A, an inverse Fourier transform part 54B, a peak component detecting part 54C, a Fourier transform part 54D, and a Fourier-transformed output signal control part 54E in the illustrated example are identical in construction and operation with the serial-to-parallel converting part 12, the inverse Fourier transform part 13, the peak component detecting part 22, the Fourier transform part 23, and the Fourier-transformed output signal control part 31 in the transmitting apparatus of FIG. 5. That is, the transmitted signal estimated value is converted to parallel signals in the serial-to-parallel converting part 54A, then the thus obtained parallel signals are subjected to inverse Fourier transform processing in the inverse Fourier transform part 54B, then in the peak component detecting part 54C those components equal to or lower than the permissible peak level $C_{th}$ are set at zeros, and the outputs are Fourier-transformed in the Fourier transform part 54D to generate peak-reduced signals. Further, in the Fourier-transformed output signal control part 54E those of the components in the peak-reduced signals which exceeds the peak-reduced signal permissible level $P_{Lth}$ are set at a predetermined level (the same value as that at the transmitting side) equal to or lower than $P_{Lth}$.

In a transmission line estimation filtering part 54F formed, for example, by an FIR filter, the outputs from the Fourier-transformed output signal control part 54E are filtered, respectively, using channel estimated values (FIR filter coefficients) representing transmission line characteristics from the channel estimating part 53, by which peak-reduced signals affected y the transmission line characteristics are generated. These peak-reduced signals are added by the adders $55_0, \ldots, 55_{N-1}$ in FIG. 13 to the respective sub-carrier received signals, by which the influence of the peak reduction processing carried out at the transmitting side is cancelled. Accordingly, the filtering part 47 provides, at its outputs, signals closer to the sub-carrier signals of N channels that are outputs from the serial-to-parallel converting part 12 of the transmitting apparatus.

In the case where the peak-reduced signal, which is the Fourier-transformed output, is subjected to various kinds of control processing at the transmitting side, the same processing as at the transmitting side needs only to be performed by the Fourier-transformed output signal control part 54E shown in FIG. 14.

Third Embodiment of Receiving Apparatus

Figure 15:
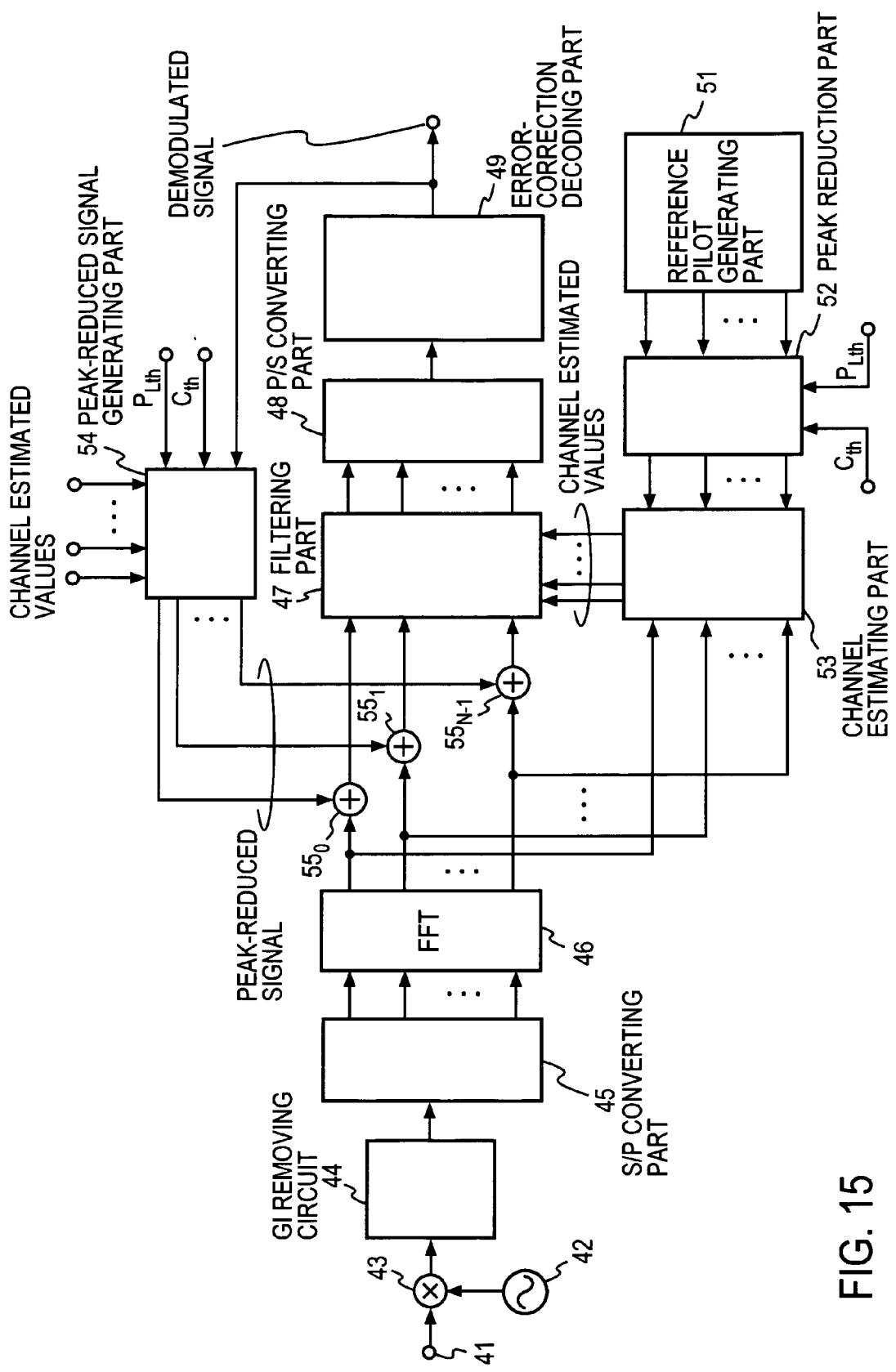
FIG. 15 is a block diagram illustrating a third embodiment of the receiving apparatus adapted for use with the transmitting apparatus of the present invention.

FIG. 15 illustrates a third embodiment of the receiving apparatus adapted for use with the transmitting apparatus of the present invention. This embodiment is configured to use the demodulated signal from the error-correction decoding part 49, instead of using the transmitted signal estimated value by the hard decision/parallel-to-serial converting part 56, and the embodiment is identical with the FIG. 13 embodiment except the above.

This receiving apparatus performs, in the first demodulation, the filtering, parallel-to-serial conversion and error-correction decoding through utilization of the sub-carrier received signals without adding the peak-reduced signals, and uses the thus obtained demodulated signal to generate peak-reduced signals in the peak-reduced signal generating part 54. Then these peak-reduced signals are added by the adders $55_0$ to $55_{N-1}$ to the sub-carrier received signals, respectively, to cancel the peak-reduced signals subtracted at the transmitting side, and filtering, parallel-to-serial conversion and error-correction decoding are carried out again.

To use, as the demodulated signal, the signal subjected to error-correction decoding is effective in the generation of the peak-reduced signals because it improves the quality of the demodulated signal for generating the peak-reduced signals, ensuring increased accuracy in their generation.

And, if necessary, by repeating a sequence of steps of generating peak-reduced signals from the above-mentioned demodulated signal and performing again filtering and decoding by use of the sub-carrier received signals added with the peak-reduced signals, it is possible to improve the accuracy of the peak-reduced signal generation, providing enhanced received characteristics.

As regards the number of times the above processing is repeated, its upper limit may be preset taking into account the amount of signal processing or a delay by processing time, or it is also possible to evaluate the quality of received signals as by CRC and use the signal quality to decide whether to repeat the processing.

In FIG. 12 showing the configuration of the peak reduction part 52 in FIGS. 11, 13 and 15, since the pattern of reference pilot signals is predetermined, all sets of values possible for the inputs to the inverse Fourier transform part 52A are predetermined. For each set of values an inverse Fourier transform can be precalculated; the calculated results can be used to calculate the outputs from the peak component detecting part 52B; the calculated outputs can be used to conduct the calculation of the Fourier transform part 52C; the Fourier-transformed outputs can be used to calculate the outputs from the Fourier-transformed signal control part 52D; furthermore, the outputs can be used for subtraction by the subtractors 52E, . . . , $52E_{N\_}1$ from the reference pilot signals. In other words, for the input reference pilot signals, peak-reduced reference pilot signals can be precalculated. Hence, by forming the peak reduction part 52 by a memory and by prestoring the peak-reduced reference pilot signals in the memory in correspondence to the precalculated reference pilot signals, it is possible to avoid the need for real-time calculations such as inverse Fourier transform and Fourier transform, and hence increase the processing speed.

Effect Of The Invention

Figure 16A:
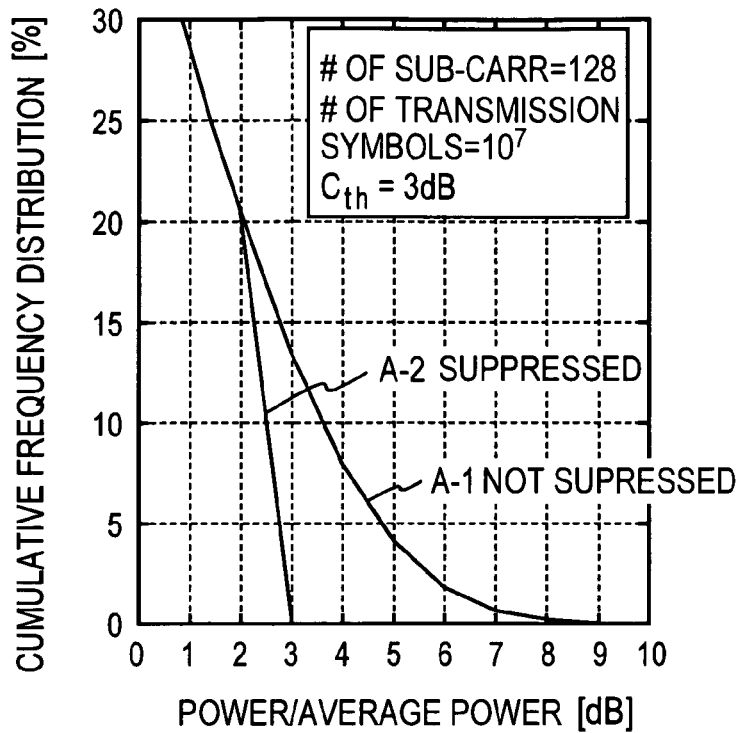
FIG. 16A is a graph showing the peak reduction effect for the transmission symbol in the FIG. 1 embodiment.

The graph of FIG. 16A shows the cumulative frequency distribution with respect to the power/average power ratio in the case where in the FIG. 1 embodiment the sub-carrier number N was 128 and $10^7$ symbols were transmitted by each sub-carrier. The curve A-1 indicates the case no peak suppression was carried out, whereas the curve A-2 indicates the case where the peak suppression was carried out with the permissible peak level $C_{th}$ set at an average power 3 dB. From this graph it is seen that the percentage of symbols with the power/average power ratio exceeding 3 dB is reduced down to zero by the peak suppression according to the present invention.

Figure 16B:
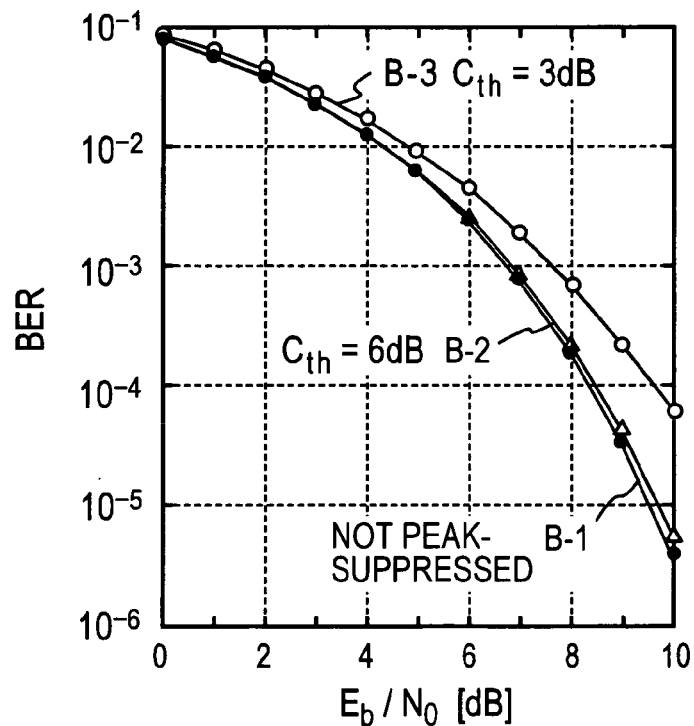
FIG. 16B is a graph showing characteristics of received signals transmitted from the FIG. 1 embodiment.

In FIG. 16B the curves B-3 and B-2 indicate Eb/No (energy per bit/noise level) vs. BER (Bit Error Rate) characteristics in the case where the peak level $C_{th}$ is 3 dB and 6 dB, respectively, and the curve B-1 indicates the BER characteristic in the case where no peak suppression is carried out. From this graph it is seen that the amount of deterioration of the received characteristics by the peak power reduction processing according to the present invention is small and that even when the permissible peak level $C_{th}$ is 3 dB, the deterioration is within a permissible range of about 1 dB with BER=$10^{-3}$.

Figure 17:
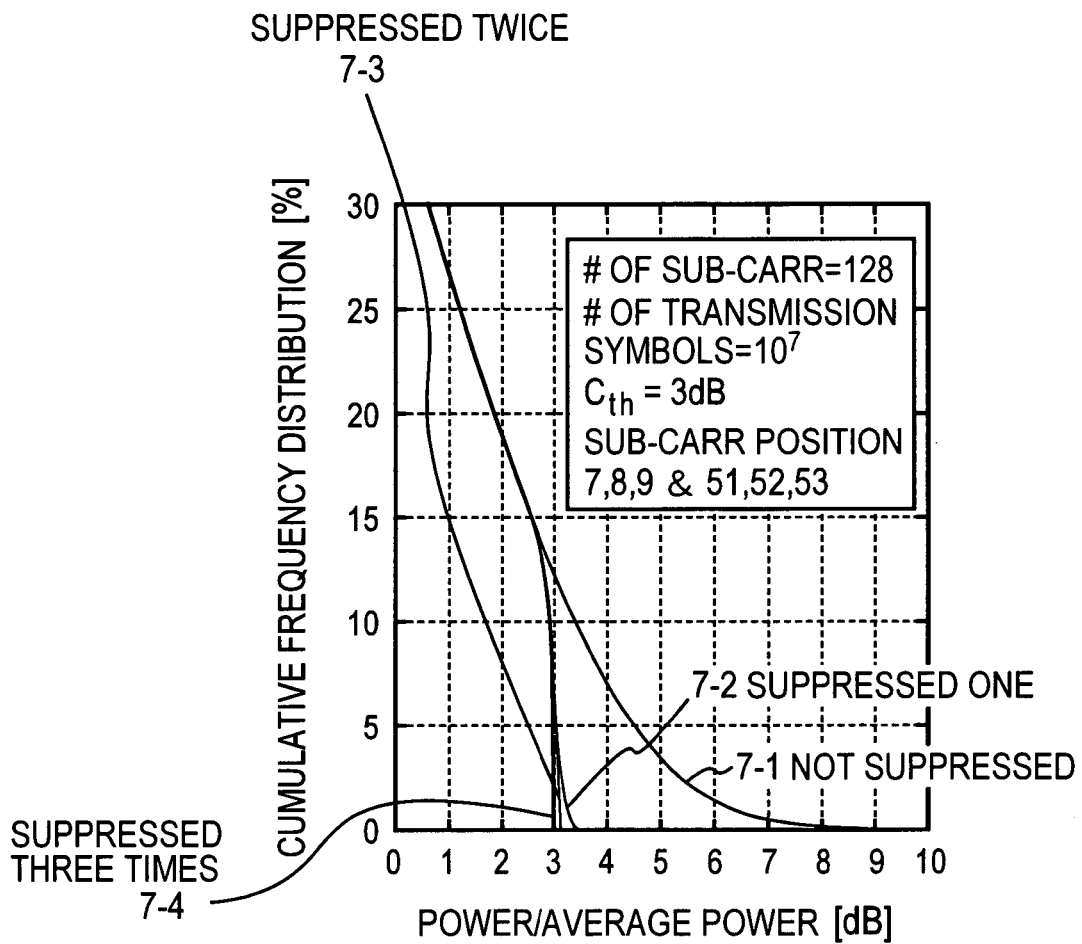
FIG. 17 is a graph showing the effect produced by the FIG. 1 embodiment.

FIG. 17 is a graph showing the effect of the FIG. 1 embodiment according to the present invention. In the graph there is shown an example where 7th, 8th, 9th, 51st, 52nd and 53rd ones of 128 sub-carriers, that is, six of them, cannot be used. The permissible peak level $C_{th}$ for the average power is set at 3 dB. It can be seen that with one time of peak reduction processing, the peak component does become equal to or lower than the permissible peak level as indicated by the curve 7-2, whereas with two and three iterations of peak reduction processing, the peak component becomes equal to or lower than the permissible peak level as indicated by the curves 7-3 and 7-4. The curve 7-1 indicates the case where no peak reduction processing is performed.

As described above, the invention permits effective reduction of the peak power of the OFDM signal or OFCDM signal, and hence reduces the maximum output of the transmitting power amplifier 18, permitting improvement of its power efficiency and reduction of its cost.

The invention claimed is:

1. An orthogonal frequency multi-carrier transmitting apparatus which arranges plural symbols to be transmitted on the frequency axis as plural sub-carrier signal components of a frequency interval equal to the symbol rate, then converts them to time domain signals, then up converts these signals and amplifies their power, thereafter transmitting them, comprising:
    an inverse Fourier transform part which transforms said plural sub-carrier signal components to plural time domain signal components;
    a peak component detecting part which compares each of said plural time domain signals with a predetermined permissible peak level to detect peak components exceeding said permissible peak level;
    a Fourier transform part which transforms said peak components to frequency domain components corresponding to said sub-carrier signal components; and
    subtracting means which subtract said frequency domain components from said plural sub-carrier signal components to be input to said inverse Fourier transform part, thereby suppressing the peak component of the transmitting output.

2. The orthogonal frequency multi-carrier transmitting apparatus as recited in claim 1, wherein said peak component detecting part sets said peak components at zero when the levels of the time domain signal components output from said inverse Fourier transform part are equal to or lower than said permissible peak level, and uses the differences between said time domain signal components and said permissible peak level as said peak components when the levels of said time domain signal components exceeds said permissible peak level.

3. The orthogonal frequency multi-carrier transmitting apparatus as recited in claim 1, wherein a permissible peak level setting part is provided which determines said permissible peak level in accordance with the level of the power-amplified transmitting signal.

4. The orthogonal frequency multi-carrier transmitting apparatus as recited in claim 1, which further comprises a Fourier-transformed output signal control part which compares the level of each of said frequency domain components from said Fourier transform part with a predetermined peak-reduced signal permissible level, and controls the level of said each frequency domain component to become equal to or lower than said peak-reduced signal permissible level.

5. The orthogonal frequency multi-carrier transmitting apparatus as recited in claim 1, which further comprises:
    plural copying parts each of which copies one of said plural symbols to a number SF that is equal to the value of a spreading factor, said SF being an integer equal to or greater than 1;
    a spreading code generating part which generates spreading codes; and
    multiplying means which spread the outputs from said plural copying parts by said spreading codes and outputs the spread results as said plural sub-carrier signal components.

6. The orthogonal frequency multi-carrier transmitting apparatus as recited in claim 1, which further comprises:
    plural copying parts each of which copies one of plural symbols to a number SF that equal to the value of a spreading factor, in each of plural routes to which plural symbols are input, said SF being an integer equal to or greater than 1;
    a spreading code generating part which generates a spreading code for each route;

multiplying means which spread the outputs from said plural copying parts of each route by said spreading code; and a combining part which combines corresponding components of the outputs from the respective multiplying means of said plural routes and outputs the combined components as sub-carrier signal components of said plural routes.

7. The orthogonal frequency multi-carrier transmitting apparatus as recited in claim 6, wherein said spreading code generating part generates a short code as said spreading code; said transmitting apparatus further comprising:

a long code generating part which generates a long code; and second multiplying means which multiply the outputs from the combining part by said long code and output multiplication results as said plural sub-carrier signal components.

8. The orthogonal frequency multi-carrier transmitting apparatus as recited in claim 1, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

9. An orthogonal frequency multi-carrier transmitting method which arranges plural symbols to be transmitted on the frequency axis as plural sub-carrier signal components of a frequency interval equal to the symbol rate, then converts them to time domain signals, then up converts these signals and amplifies their power, thereafter transmitting them, comprising:

(a) a step of performing inverse Fourier transform processing of said plural sub-carrier signal components to transform them to plural time domain signal components;

(b) a step of comparing each of said plural time domain signal components with a predetermined permissible peak level to detect peak components exceeding said permissible peak level;

(c) a step of Fourier-transforming said peak components to frequency domain components corresponding to said sub-carrier signal components; and (d) a step of subtracting said frequency domain components from said plural sub-carrier signal components to thereby suppress the peak component of a transmitting output.

10. The orthogonal frequency multi-carrier transmitting method as recited in claim 9, wherein said steps (a), (b), (c) and (d) are repeatedly performed until the levels of all of said plural time domain signal components become equal to or lower than said permissible peak level in said step (b).

11. The orthogonal frequency multi-carrier transmitting method as recited in claim 9, wherein the time domain signal components corresponding to said sub-carrier signal components are read out from a memory in which there are stored time domain signal components that are obtained when peak reduction processing by said steps (a), (b), (c) and (d) is performed in advance for each possible combination of the respective sub-carrier components until peak components become equal to or lower than said permissible peak level.

12. The orthogonal frequency multi-carrier transmitting apparatus as recited in claim 3, which further comprises a Fourier-transformed output signal control part which compares the level of each of said frequency domain components from said Fourier transform part with a predetermined peak-reduced signal permissible level, and controls the level of said each frequency domain component to become equal to or lower than said peak-reduced signal permissible level.

13. The orthogonal frequency multi-carrier transmitting apparatus as recited in claim 2, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

14. The orthogonal frequency multi-carrier transmitting apparatus as recited in claim 3, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

15. The orthogonal frequency multi-carrier transmitting apparatus as recited in claim 4, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

16. The orthogonal frequency multi-carrier transmitting apparatus as recited in claim 5, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

17. The orthogonal frequency multi-carrier transmitting apparatus as recited in claim 6, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

18. The orthogonal frequency multi-carrier transmitting apparatus as recited in claim 7, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

19. The orthogonal frequency multi-carrier transmitting apparatus as recited in claim 12, wherein a set of said inverse Fourier transform part, said peak component detecting part, said Fourier transform part and said subtracting means is formed by a memory in which there are stored time domain signal components that are obtained when peak reduction processing by said inverse Fourier transform part, said peak component detecting part, said Fourier transform part and said subtracting means is performed in advance for each possible combination of the respective sub-carrier components until peak components become equal to or lower than said permissible peak level.

* * * * *